(12) United States Patent
Ramzan et al.

(10) Patent No.: US 8,132,006 B2
(45) Date of Patent: Mar. 6, 2012

(54) CRYPTOGRAPHIC AUTHENTICATION AND/OR ESTABLISHMENT OF SHARED CRYPTOGRAPHIC KEYS, INCLUDING, BUT NOT LIMITED TO, PASSWORD AUTHENTICATED KEY EXCHANGE (PAKE)

(75) Inventors: Zulfikar Amin Ramzan, San Mateo, CA (US); Craig B. Gentry, Mountain View, CA (US); Philip Mackenzie, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1265 days.

(21) Appl. No.: 11/415,558

(22) Filed: May 1, 2006

(65) Prior Publication Data
US 2006/0291661 A1 Dec. 28, 2006

Related U.S. Application Data

(60) Provisional application No. 60/677,483, filed on May 3, 2005.

(51) Int. Cl.
*H04L 9/32* (2006.01)
(52) U.S. Cl. ...................................................... 713/168
(58) Field of Classification Search .................. 713/168
See application file for complete search history.

(56) References Cited

U.S. PATENT DOCUMENTS

| | | | |
|---|---|---|---|
| 6,438,554 B1 | 8/2002 | Di-Crescenzo et al. | |
| 6,757,825 B1 | 6/2004 | MacKenzie et al. | |
| 6,868,160 B1 * | 3/2005 | Raji | 380/30 |

OTHER PUBLICATIONS

Boyko et al., "Provably Secure Password-Authenticated Key Exchange Using Diffie-Hellman" (Full Version), Sep. 8, 2000, pp. 1-52.*
Zhang, Muxiang, "New Approaches to Password Authenticated Key Exchange based on RSA", 2004, pp. 228-242.*
MacKenzie et al., "Password-Authenticated Key Exchange Based on RSA", 2000, pp. 599-613.*
International Search Report for International Application No. PCT/US06/17115, 2 pages.
Written Opinion for International Application No. PCT/US06/17115, 5 pages.

(Continued)

*Primary Examiner* — Jeffrey D Popham
(74) *Attorney, Agent, or Firm* — Haynes and Boone, LLP

(57) ABSTRACT

A server (120) uses a password ($\pi$) to construct a multiplicative group ($Z_N^*$) with a (hidden) smooth order subgroup ($<x'>$), where the group order ($P_\pi$) depends on the password. The client (110) uses its knowledge of the password to generate a root extraction problem instance (z) in the group and to generate data (y) allowing the server to construct a discrete logarithm problem instance (y') in the subgroup. The server uses its knowledge of the group order to solve the root extraction problem, and solves the discrete logarithm problem efficiently by leveraging the smoothness of the subgroup. A shared key (sk) can be computed as a function of the solutions to the discrete logarithm and root extraction problem instances. In some embodiments, in an oblivious transfer protocol, the server queries the client (at 230) for data whose position in a database (210) is defined by the password. The client provides (240) such data without knowing the data position associated with the server's query. The client obtains the data position independently from the password. The data positions and/or the respective data are used for authentication and shared secret key generation. Other embodiments are also provided.

75 Claims, 4 Drawing Sheets

OTHER PUBLICATIONS

J. Katz et al. "Efficient Password-Authenticated Key Exchange Using Human-Memorable Passwords," In *Proc. of Eurocrypt 2001*, LNCS 2045, pp. 475-494. Springer, 2001.

M. Abdalla and D. Pointcheval. Simple password-based encrypted key exchange protocols. In *Proc. of CT-RSA 2005*, LNCS 3376, pp. 191-208. Springer, 2005.

M. Bellare, D. Pointcheval and P. Rogaway. Authenticated key exchange secure against dictionary attacks. In *Proc. of Eurocrypt 2000*, LNCS 1807, pp. 139-155. Springer, 2000.

M. Bellare and P. Rogaway. Random oracles are practical: a paradigm for designing efficient protocols. In *Proc. of ACM CCS 1993*, pp. 62-73. ACM, 1993.

M. Bellare and P. Rogaway. Entity authentication and key distribution. In *Proc. of Crypto 1993*, LNCS 773, pp. 232-249. Springer, 1994.

M. Bellare and P. Rogaway. Provably secure session key distribution: the three party case. In *Proc. of STOC 1995*, pp. 57-66. ACM, 1995.

S. M. Bellovin and M. Merritt. Encrypted key exchange: password-based protocols secure against dictionary attacks. In *IEEE Symposium on Research in Security and Privacy*, pp. 72-84. IEEE, 1992.

S. M. Bellovin and M. Merritt. Augmented encrypted key exchange: a password-based protocol secure against dictionary attacks and password file compromise. In *ACM CCS 1993*, pp. 244-250. ACM, 1993.

D. Boneh. The decision Diffie-Hellman problem. In *Proc. of ANTS-III*, LNCS 1423, pp. 48-63. Springer, 1998.

R. C. Bose and D. K. Ray-Chaudhuri. On a class of error correcting binary group codes. *Inf. Control*, 3, pp. 68-79, 1960.

V. Boyko, P. MacKenzie and S. Patel. Provably secure password authentication and key exchange using Diffie-Hellman. In *Proc. of Eurocrypt 2000*, LNCS 1807, pp. 156-171. Springer, 2000.

C. Cachin, S. Micali, M. Stadler, Computational private information retrieval with polylogarithmic communication. In *Proc. of Eurocrypt 1999*, LNCS 1592, pp. 402-414, Springer, 1999.

R. Canetti, O. Goldreich and S. Halevi. The random oracle methodology, revisited. In *JACM*, vol. 51, No. 4, pp. 557-594. ACM, 2004. (Preliminary version appeared in STOC 1998, pp. 209-218.).

R. Canetti, S. Halevi, J. Katz, Y. Lindell and P. MacKenzie. Universally-composable password-based key exchange. In *Proc. of Eurocrypt 2005*, LNCS 3494, pp. 404-421. Springer, 2005.

D. Coppersmith, Finding a small root of a bivariate integer equation; factoring with high bits known. In *Proc. of Eurocrypt 1996*, LNCS 1070, pp. 178-189. Springer, 1996.

D. Coppersmith, Finding a small root of a univariate modular equation. In *Proc. of Eurocrypt 1996*, LNCS 1070, pp. 155-165. Springer, 1996.

R. Cramer and V. Shoup. A practical public key cryptosystem provably secure against adaptive chosen ciphertext attack. In *Proc. of Crypto 1998*, LNCS 1462, pp. 13-25. Springer, 1998.

R. Cramer and V. Shoup. Universal hash proofs and a paradigm for chosen ciphertext secure public key encryption. In *Proc. of Eurocrypt 2002*, LNCS 2332, pp. 45-64. Springer, 2002.

I. Damgard and M. Koprowski. Generic lower bounds for root extraction and signature schemes in general groups. In *Proc. of Eurocrypt 2002*, LNCS 2332, pp. 256-271. Springer, 2002.

W. Diffie and M. Hellman. New directions in cryptography. *IEEE Trans. Info. Theory*, 22(6): 644-654, 1976.

C. Dwork and M. Naor. Pricing via processing or combatting junk mail. In *Proc. of Crypto 1992*, LNCS 740, pp. 139-147. Springer, 1993.

R. Gennaro and Y. Lindell. A framework for password-based authenticated key exchange. In *Proc. of Eurocrypt 2003*, LNCS 2656, pp. 524-543. Springer, 2003.

C. Gentry and Z. Ramzan. Single-database private information retrieval with constant communication rate. In *Proc. of ICALP 2005*, pp. 803-814. Springer, 2005.

O. Goldreich and Y. Lindell. Session-key generation using human passwords only. In *Proc. of Crypto 2001*, LNCS 2139, pp. 408-432. Springer, 2001.

L. Gong. Optimal authentication protocols resistant to password guessing attacks. In *IEEE Computer Security Foundations Workshop*, pp. 24-29. IEEE, 1995.

L. Gong, T. M. A. Lomas, R. M. Needham and J. H. Saltzer. Protecting poorly chosen secrets from guessing attacks. In *IEEE Journal on Selected Areas in Communications*, 11(5): 648-656, Jun. 1993.

A. Hocquenghem. Codes corecteurs d'erreurs. *Chiffres*, 2, pp. 147-156, 1959.

IEEE Standard 1363-2000, Standard specifications for public key cryptography, 2000.

D. Jablon. Strong password-only authenticated key exchange. In *ACM Computer Communication Review, ACM SIGCOMM*, 26(5): 5-20, 1996.

D. Jablon. Extended password key exchange protocols immune to dictionary attack. In *WETICE '97 Workshop on Enterprise Security*, pp. 248-255. IEEE, 1997.

S. Jiang and G. Gong. Password based key exchange with mutual authentication. In *Proc. of SAC 2004*, LNCS 3357, pp. 267-279. Springer, 2004.

J. Katz, R. Ostrovsky and M. Yung. Practical password-authenticated key exchange provably secure under standard assumptions. In *Proc of Eurocrypt 2001*, LNCS 2045, pp. 475-494, Springer, 2001.

C. Kaufman and R. Perlman. PDM: a new strong password-based protocol. In *Usenix Security Symposium*, 2001.

T. Kwon. Authentication and key agreement via memorable passwords. In *Proc. of NDSS 2001*. ISOC, 2001.

A. Lenstra and E. Verheul. Selecting cryptographic key sizes. In *Journal of Cryptology*, 14(4): 255-293, 2001.

"BCH code" Wikipedia, the free encyclopedia http://en.wikipedia.org/wiki/BCH_code, 2006.

S. Lucks. Open key exchange: How to defeat dictionary attacks without encrypting public keys. In *Proc. of Security Protocols Workshop*, LNCS 1361, pp. 79-90. Springer, 1998.

P. MacKenzie, S. Patel and R. Swaminathan. Password authenticated key exchange based on RSA. In *Proc. of Asiacrypt 2000*, LNCS 1976, pp. 599-613. Springer, 2000.

A. May. A tool kit for finding small roots of bivariate polynomials over the integers. In *Proc. of Eurocrypt 2005*, LNCS 3494, pp. 251-267. Springer, 2005.

M. Naor and B. Pinkas. Oblivious transfer and polynomial evaluation. In *Proc. of STOC 1999*, pp. 245-254. ACM, 1999.

National Institute of Standards and Technology (NIST). Announcing the Secure Hash Standard, FIPS 180-1, U.S. Department of Commerce, Apr. 1995.

S. Patel. Number theoretic attacks on secure password schemes. In *Proc. of the IEEE Sym. on Research in Security and Privacy*, pp. 236-247, 1997.

M. O. Rabin. How to exchange secrets by oblivious transfer. Unpublished manuscript, 1981.

R. Rivest, A. Shamir, and L. Adleman. A method for obtaining digital signature and public key cryptosystems. In *Communications of the ACM*, 21:120-126, 1978.

M. Steiner, G. Tsudik, and M. Waidner. Refinement and extension of encrypted key exchange. In *Operating System Review*, 29:22-30. ACM, 1995.

T. Wu. The secure remote password protocol. In *Proc. of NDSS 1998*, pp. 97-111. ISOC, 1998.

T. Wu. A real-world analysis of Kerberos password security. In *Proc. of NDSS 1999*, ISOC, 1999.

M. Zhang. New approaches to password authenticated key exchange based on RSA. In *Proc. of Asiacrypt 2004*, LNCS 3329, pp. 230-244. Springer, 2004.

J. A. Buchmann. Introduction to Cryptography ($2^{nd}$ ed., Springer-Verlag), pp. 213-226, 2000.

Non-Final Office Action dated Dec. 12, 2011 for U.S. Appl. No. 12/756,465, 17 pages.

\* cited by examiner $$\pi \to \{0,1\}^k \xrightarrow{\alpha} s = 01\ldots1 \in \{0,1\}^n$$ FIG. 3

CRYPTOGRAPHIC AUTHENTICATION AND/OR ESTABLISHMENT OF SHARED CRYPTOGRAPHIC KEYS, INCLUDING, BUT NOT LIMITED TO, PASSWORD AUTHENTICATED KEY EXCHANGE (PAKE)

CROSS REFERENCE TO RELATED APPLICATIONS

The present application claims priority of U.S. provisional patent application No. 60/677,483, filed May 3, 2005, incorporated herein by reference.

BACKGROUND OF THE INVENTION

The present invention relates to cryptography, and more particularly to authentication, e.g. password authentication. In some embodiments, the invention allows establishment of a secure communication channel between two computer systems.

Consider two parties, Alice and Bob, who wish to use their respective computer systems 110, 120 (FIG. 1) to communicate securely over an insecure network 130. Suppose their only means of verifying each other's identity consists of a short secret password (e.g., a 4-digit PIN number $\pi$). In particular, neither of them knows a public key corresponding to the other party, and neither has a certified public key (i.e., a public key whose certificate can be verified by the other party). Here, Alice should be concerned not only with eavesdroppers, but also with the party with whom she is communicating since a priori she cannot even be certain that it is Bob. Bob's situation is similar.

If Alice and Bob shared a high-strength cryptographic key (i.e., a long secret), then this problem could be solved using standard solutions for setting up a secure channel (e.g., [4]; the bracketed numbers indicated references cited at the end of this disclosure before the claims). However, since Alice and Bob only share a short secret password, they must also be concerned with offline dictionary attacks. An offline dictionary attack occurs when an attacker obtains some information that can be used to perform offline verification of password guesses. We will call this password verification information. For a specific example, consider the following. Say Alice and Bob share a password $\pi$, and say an attacker somehow obtained a hash of the password $h(\pi)$, where h is some common cryptographic hash function such as SHA-1 [40]. Then an attacker could go offline and run through a dictionary of possible passwords $\{\pi_1, \pi_2, \ldots\}$, testing whether $h(\pi_i)=h(\pi)$. In general, the password verification information obtained by the attacker may not be as simple as a hash of a password, and an attacker may not always be able to test all possible passwords against the password verification information, but if he can test a significant number of passwords, this is still considered an offline dictionary attack. See Wu [46] for a fairly recent demonstration of how effective an offline dictionary attack can be.

Many common techniques for password authentication are unilateral authentication techniques—that is, only one party (a user or client 110 or 120) is authenticated to the other party (a server 120 or 110), but not vice-versa; they are also vulnerable to offline dictionary attacks or rely on certified (or otherwise authenticated) public keys.

The simplest password authentication technique is for the client to send a password to the server in the clear. This technique is used in some older Internet applications, as well as many web-based mail applications. Obviously this is insecure against an eavesdropper on the network, but is often considered acceptable on channels in which eavesdropping is relatively difficult.

A more advanced technique is challenge-response, in which the server sends a challenge to the client, and the client responds with a message depending on the challenge and the password, for instance the hash of the challenge and password concatenated. This type of authentication is used in some operating systems to enable network access. It is vulnerable to an offline dictionary attack by an eavesdropper since the challenge and its corresponding response, together, make password verification information.

A more secure technique sends a password to the server over an anonymous secure channel, in which the server has been verified using a public key. This type of authentication is used in some remote terminal applications, as well as web-based applications, and it depends intrinsically on the ability of the client to verify the server's public key (otherwise, an attacker can impersonate the server). When used on the web, the public key of the server is certified by a certification authority that is presumably trusted by the client. For remote terminal applications, there typically is no trusted third party, and security relies on the client recognizing the public key, perhaps with a "fingerprint," or hash, of the public key.

PASSWORD AUTHENTICATED KEY EXCHANGE (PAKE). The purpose of PAKE is to provide mutual password authentication without pre-authenticated public keys and in such a way that the only feasible way to attack the protocol is to run a trivial online dictionary attack of simply iteratively guessing passwords and attempting to impersonate one of the parties. (Note that online attacks are easier to detect and thwart.) Using a PAKE protocol, the authenticating parties can "bootstrap" a short secret (the password) into a long secret (a cryptographic key) that thereafter can be used to provide a secure channel.

The problem of designing a secure PAKE protocol was proposed by Bellovin and Merritt [6] and by Gong et al. [25], and has since been studied extensively. Many PAKE protocols have been proposed, e.g., [7, 25, 24, 28, 29, 36, 44, 45, 33, 32], and many of these protocols have been shown to be insecure (see e.g., [41]). Recent protocols have proofs of security, based on certain well-known cryptographic assumptions, although some of these proofs assume the existence of ideal hash functions or ideal ciphers (i.e., black-box perfectly-random functions (random oracles) or keyed permutations, respectively). A few recent papers [2,10,1] present refinements of the EKE protocol of [7] and prove security based on the Diffie-Hellman (DH) assumption [19]. The first assumes both ideal ciphers and ideal hashes, while the others assume only ideal hashes. Other papers [37,47] present refinements of the OKE protocol of [36] and prove security based on the RSA assumption [43]. These all assume ideal hashes. Another paper [31] presents a new protocol based on a variant of the Cramer-Shoup cryptosystem [16] and proves security based on the decisional DH assumption (see, e.g., [8]), assuming only a public random string (not an ideal hash function). Some variants of the [31] protocol are presented in [21,30,13]. Another password-authenticated key exchange protocol was developed in [23] and proven secure based on trapdoor permutations without any setup assumptions, but with a restriction that concurrent sessions with the same password are prohibited.

Many existing techniques for designing efficient PAKE protocols can be viewed as variations of a small number of fundamental paradigms, and some of them are based on either the Diffie-Hellman or RSA assumptions. In particular, some existing techniques for designing efficient and provably secure PAKE protocols may be viewed as falling into one of the following two basic paradigms:

the password is used to encrypt some part of a message that is being used to perform key exchange, e.g., [1, 6, 10, 31, 37, 46, 47], or the password is used to choose a parameter in a standard key exchange, e.g., [28, 32].

Another approach to achieving PAKE is using oblivious polynomial evaluation (OPE), a primitive introduced by Naor and Pinkas [39]. OPE is a more general form of oblivious transfer (OT), first suggested by Rabin [42]. Goldreich and Lindell [23], following a suggestion of [39], showed that, by using OPE, one can achieve PAKE in the standard model using only trapdoor permutations. Although these are important theoretical contributions, the PAKE protocols based on OPE are not competitive with the most efficient PAKE protocols.

SUMMARY

This section summarizes some features of the invention. The invention is defined by the appended claims.

For illustration purposes, some embodiments will be described as a communication between two computer systems one of which will be called a "client" and the other one a "server". For example, in FIG. 1, computer system 110 can be a client and computer system 120 can be a server. However, some embodiments are suitable for any computer systems. The "client" and "server" can be interchanged, and further the computer systems do not have to be clients and servers relative to each other.

In some embodiments, the server generates a group whose order has a predefined property with respect to the password $\pi$. For example, the group can be $Z_N^*$ such that Euler's totient function $\phi(N)$ is divisible by some numbers selected based on the password $\pi$ and is relatively prime to some other numbers selected based on the password. The group description is sent to the client. In some embodiments, the group order is not provided to the client.

The client generates a root extraction problem instance and a discrete logarithm problem instance in the group, and sends the two instances to the server. If the server does not know the password, then the probability is negligibly small that the server will be able to correctly solve the two problem instances. In some embodiments, the server transforms the discrete logarithm problem in the group G into a different discrete logarithm problem in a subgroup of G. In some embodiments, the subgroup has a lower order than G, so the discrete logarithm problem can be solved more efficiently. In some embodiments, the subgroup may or may not have a lower order than G, but the subgroup is a cyclic subgroup of a composite order, so the discrete logarithm problem can be reduced to the discrete logarithm problems in subgroups of lower orders using the Pohlig-Hellman algorithm (described in the Addendum below before the References section before the claims). In particular, high efficiency can be obtained if the composite order is "smooth", i.e. is the product of prime factors' powers $p^{e(p)}$ such that the values p are all in a narrower range. In some embodiments, the discrete logarithm problem instance and/or the root extraction problem instance are generated based on the password, and thus are evidence of the client's knowledge of the password. The solutions of the root extraction problem instance and the discrete logarithm problem instance can be used to generate a shared secret key sk which can have more entropy than the password, i.e. be less predictable for an attacker and hence more secure against an offline dictionary attack. The entropy increase can be due to the secret key sk being longer than the password $\pi$. Alternatively, or in addition, the entropy can be higher due to the secret key being more like a random string rather than an ordinary word or phrase, a birth date, a telephone number, or some other string of the kind meaningful to humans and hence often selected for passwords.

In some embodiments, the server and the client engage in an oblivious transfer protocol. The server queries the client for data whose position in a database is defined by the password. For example, the client may generate the database as a set of pairs of random strings, and the server selects one string from each pair. The client provides the requested data to the server without knowing the data position associated with the server's query. For example, in some embodiments, the client sends the entire database to the server in an encrypted form such that the server can decrypt the data in the desired position but cannot decrypt the remaining data; on the other hand, the client can check that the server will not be able to decrypt all the data but the client cannot determine which data the server will be able to decrypt. The client however obtains the data position independently since the client knows the password. Then the client and the server perform a data exchange to allow them to verify that each has the same data position as the other. For example, the client may compute a confirmation value $v_1$ as a hash function $H_1$ of the client's data position and/or the respective data, and can send the value v to the server. The server computes the same hash function on its own data position and/or the data obtained from the client, and the server checks that the resulting value is equal to v. The server may provide the client with another confirmation value $v_2$, computed using a different hash function $H_2$, to allow the client to perform similar verification. Also, the data position, or the respective data, can be used to generate a shared secret key sk (e.g. as a hash function $H_0$ of the data position and/or the respective data). The key sk, and the confirmation values $v_1$ and $v_2$, can also depend on ancillary data, such as a counter or a nonce, to ensure that the key and the confirmation values are fresh. The key and the confirmation values can also depend on the password. In some embodiments, the key is generated before the confirmation values, and the confirmation values are generated as hash functions of sk (e.g. v=H(sk)).

The invention is not limited to the features and advantages described above. The invention is defined by the appended claims.

BRIEF DESCRIPTION OF THE DRAWINGS

FIG. 3 illustrates a password mapping used in some embodiments of the present invention.

DESCRIPTION OF SOME EMBODIMENTS

Figure 1:
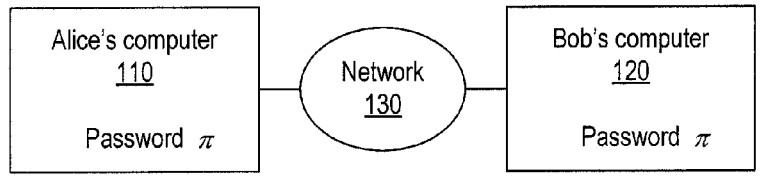
FIG. 1 is a block diagram of a networked computer system used in prior art communications and also in some embodiments of the present invention.

This section describes some embodiments of the invention. The invention is not limited by particular computations, processors, and other features. The invention is described by the appended claims.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is a method requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Throughout the description, terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments of the invention can be implemented with hardwired circuitry and/or with a software computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media or data carrier suitable for storing computer instructions, and each coupled to a computer system bus. Computer programs can be also carried by data carrier signals over networks. Thus, the programs can be carried by carrier waves, infrared signals, digital signals, etc.

It is known to one of ordinary skill in the cryptographic arts that the security of many cryptographic inventions relies upon making certain computational intractability assumptions; for example, one may try to prove that a cryptosystem is secure so long as it is difficult to decompose a specific number into its prime factors efficiently. The term "computational" is often used in the art to identify this class of cryptographic inventions. The present invention provides a computational scheme for password authenticated key exchange. The term "information theoretic" or "unconditional" is often used in the art in conjunction with schemes that are mathematically seen to meet a specific meaningful security definition without making any type of assumption.

While it is generally preferable from a pure security perspective not to have any computational assumptions whatsoever, there are instances of problems that cannot be solved without making such an assumption (the present invention serves as such an example). In particular, according to the present state of the art, it is not possible to construct a PAKE scheme without requiring public-key cryptography [27]. Further, it is unknown, according to the present state of the art, how to implement public-key cryptography without making some form of computational assumption. Therefore, all PAKE schemes in the art, including the one described herein, require some form of computational assumption. These assumptions will be described later. Further, it is generally known by those skilled in the art that cryptographic methods can sometimes be made more efficient by incorporating computational assumptions.

It also worth noting that often times one assumption implies another. That is, if one of the assumptions were actually true, then another assumption would be seen to be true by a mathematically logical argument. Typically the means used by those skilled in the art to show such an implication, is a transformation (often known in the art as a reduction) that converts a mechanism for violating the second assumption to a mechanism for violating the first assumption. In such cases, the first assumption is called "stronger" or the second "weaker." In general, weaker assumptions are preferable.

1. Preliminaries

First, we build some notation. As usual, Z denotes the ring of integers, and $Z_N$ the ring of the least non-negative residues modulo a positive integer N. For a ring, the asterisk (*) denotes the multiplicative unit group of a ring. Thus, $Z_N^*$ is the multiplicative group of $Z_N$ (consisting of all the invertible elements of $Z_N$). $\phi(N)$ is Euler's totient function (equal to the number of positive integers less than N and coprime to N).

For a group G, |G| denotes the order of G. For a group element x, <x> denotes the cyclic subgroup generated by x. The acronym "gcd" stands for "greatest common divisor".

Some embodiments of the present invention employ some aspects of oblivious transfer to achieve PAKE. First, recall that in a 1-out-of-2 (string) OT protocol, the sender starts with two strings $r_0$ and $r_1$, and the chooser starts with a bit $b \in \{0,1\}$; by the end of the protocol, the chooser learns $r_b$ without learning any information about $r_{1-b}$, and without revealing any information about b to the sender. In one example (FIG. 2), the system 110 (e.g. a client) plays the role of "sender," while the system 120 (e.g. a server) acts as a "chooser."

Figure 2:
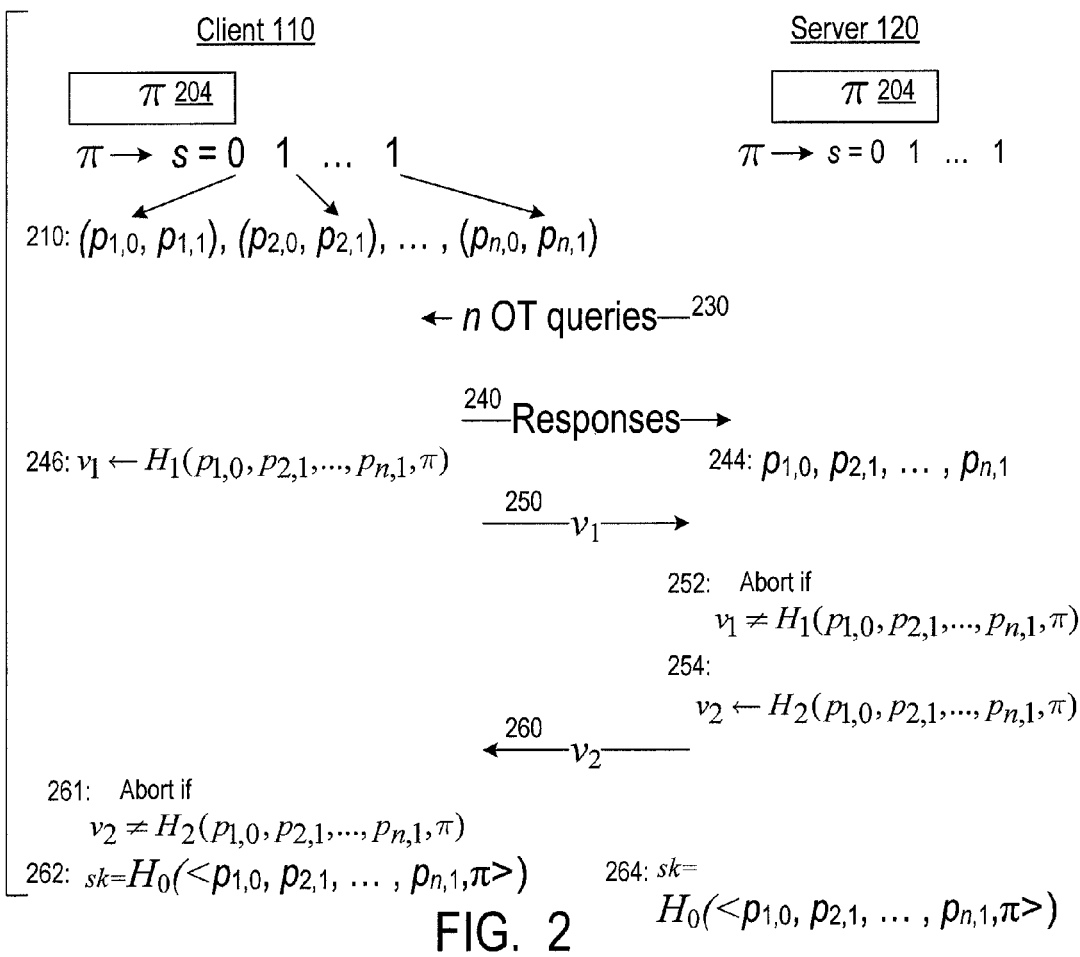
FIG. 2 illustrates a communication protocol according to some embodiments of the present invention.

More specifically, in some embodiments, both the client and the server store the password $\pi$ in their respective memory. The numeral 204 denotes both the password and the client's or server's physical memory storing the password. The client generates a random "database" 210 with n pairs of entries $\{(p_{1,0}, p_{1,1}), (p_{2,0}, p_{2,1}) \ldots (p_{n,0}, p_{n,1})\}$. Each entry $p_{i,j}$ could be an 2l-bit string for example. Passwords are mapped (possibly injectively) to n-bit strings s. In the example of FIG. 2, the password $\pi$ is, or is mapped into, a string $s=01\ldots1$. For each number $i=1, \ldots, n$, the bit $s_i$ is used to define the position (0 or 1) of a number in the pair $(p_{i,0}, p_{i,1})$; for example, in some embodiments, the bit $s_i$ is associated with the database entry $p_{i,0}$ if $s_i=0$, and with the entry $p_{i,1}$ if $s_i=1$. Thus, in the example of FIG. 2, the password $\pi(s=01\ldots1)$ is associated with the sequence of entries $p_{1,0}, p_{2,1}, \ldots p_{n,1}$. Server 120 computes the string s and constructs, for each number i, an 1-out-of-2 OT query 230 to recover the database entry at position $s_i$ from the pair $(p_{i,0}, p_{i,1})$. The client responds to the server's queries (at 240). The server 120 uses the responses to compute the corresponding database entries (at 244). The server does not learn the other database entries, and does not learn the position of the entries computed at 244 in the pairs 210. Thus, the server does not learn the client's version of the password $\pi$ or the string s. Likewise, the client does not learn the server's version of the password $\pi$ or the string s. At 246, the client 110 computes a confirmation value $v_1$—e.g., a hash, using a public hash function $H_1$, of a string that includes the n database entries corresponding to the client's version of the password as well as the password itself. The client sends the confirmation value $v_1$ to the server (at 250). The server computes a similar hash at 252 with the entries computed at 244, and aborts if this computation provides a result different from $v_1$. If the two values are equal, the authentication operation is considered successful at the server. (Of course, this authentication operation can be combined with other authentication operations.)

Optionally, the server provides confirmation to the client that the server knows the password. For example, at 254, the server computes a confirmation value $v_2$—e.g., a hash, using a public hash function $H_2$, of a string that includes the n database entries computed at 244 as well as the password. The server sends the confirmation value $v_2$ to the server (at 260). The client computes a similar hash at 261 with the entries determined from the client's version of the password, and aborts if this computation provides a result different from $v_2$. If the two values are equal, the authentication operation is considered successful at the client.

Since the confirmation value $v_1$ is a function of the password, the client cannot complete the authentication protocol without knowing the password $\pi$. If the confirmation value is not a function of the password, then the client can cheat by choosing identical database numbers for each i ($p_{i,0}=p_{i,1}$ for each i), which would permit the client to complete the protocol without knowing the password.

If the emphasis is on testing the server, the steps 246, 250, 252 can be omitted.

The client (at 262) and the server (at 264) then compute a shared cryptographic key sk as a function (e.g. a public hash function $H_0$) of the n entries corresponding to the password (these entries are defined by the string s by the client and are computed at 244 by the server). In some embodiments, the key sk has more entropy (e.g. is longer, and/or looks more random to humans) than the password $\pi$. The key sk can be used for symmetric encryption of subsequent communications between the client and the server. Security against a malicious client follows from the chooser-privacy of the OT scheme. Roughly speaking, security against a malicious server follows from sender-privacy. The server can use the client's OT responses to test only one password—i.e., the password that the server used to parameterize its OT queries; if the server guessed wrong, sender-privacy ensures that the server will have essentially "no information" about one of the high-entropy (2l-bit) strings that the client input to the hash function, and therefore will not be able to use the client's hash as password verification information.

The invention is not limited to the exact steps or sequence of steps of FIG. 2. For example, the client and the server may compute the key sk before the respective steps 246, 252, and then compute the confirmation values $v_1$, $v_2$ as hash functions of the shared key, e.g. $v_1=H_1(sk)$, $v_2=H_2(sk)$. Other variations are also possible.

In some embodiments, we improve the performance of our scheme by using error-correcting codes—i.e., as shown in FIG. 3, we map a password $\pi$ to a k-bit string for k<n (e.g. the password $\pi$ can be a k bit string), and the k bit string to an n-bit string s using a code with minimum distance d (the latter mapping is shown as a in FIG. 3). In this setting, the server 120 can feasibly test only the password $\pi$ whose n-bit string s is closest (in terms of Hamming distance) to the n-bit string associated with its n OT queries; for all other candidate passwords, it will (roughly speaking) lack at least dl bits that the client input to the hash function. We find various performance "sweet spots" for (n, k, d, l), subject to the constraints that dl must be large enough (e.g., 80) to make offline guessing infeasible, nl is reasonably small for efficiency, and (n, k, d) corresponds to an efficient error correcting code. In this setting, we then find that our high-level OT-based description above is actually stronger than what we need, since we do not need the 1-out-of-2 OT schemes to be secure individually, as long as they are, in some sense, secure in the aggregate. Moreover, some embodiments of our PAKE scheme work for some set of sufficiently random databases 210 (rather than all databases). Some embodiments of our PAKE scheme also employ a number-theoretic method for efficiently "batching" the n OT queries and responses above into a single short query and response.

In some embodiments, our scheme uses n (public) pairs of prime numbers $\{(p_{i,0},p_{i,1}):i\in[1,n]\}$, and employs two problems that are, in some sense, "duals" of each other—namely, for a cyclic group G and a prime number p, it uses:

(Discrete Log (Weakened Version)): Given a generator $x \in G$ and $h=x^e$, compute e mod p;

(Root Extraction): Given $j \in G$, compute $j^{-1/p}$.

Why are these problems "duals" of each other? First, consider the case where p divides the group order |G|. Then, the above discrete log problem has a unique solution in $\{0, \ldots, p-1\}$. However, if j is a p-residue in G (i.e. j is the p-th power of some element of G), the solution to the root extraction problem is not unique; there are p valid solutions. Next, consider the case where p does not divide |G|; here, the "solvability" situation of the two problems is reversed. The root extraction problem has a unique solution. (RSA decryption is based on this fact.) However, the discrete log problem has p valid solutions. Specifically, if $e' \in Z$ satisfies $h=x^{e'}$, then $h=x^e$ for all $\{e=e'+r|G|:r\in Z\}$; since gcd(p,|G|)=1, the values of e mod p cover all of $\{0, \ldots, p-1\}$.

Keeping this in mind, the client 110 (FIG. 4) generates the database 210 as in FIG. 2, but this time the database is shared with the server 120. The database can alternatively be generated by server 120 and/or other parties. The numbers $p_{i,j}$ are distinct and are primes or at least pairwise coprime. The client and the server each keep their versions of the password 204 secret. At 410, the server constructs a group G such that its order is divisible by all of the numbers $p_{i,s_i}$ but none of the numbers $p_{i,1-s_i}$. (In some embodiments, $G=Z_N^*$ where N is a composite, RSA modulus generated by the server). The server sends a description of the group G (e.g. the modulus N) and the group's generator x to the client (at 420). The client uses G, x to generate "challenges" to the server to solve instances of the discrete log problem for the $p_{i,s_i}$'s and instances of the root extraction problem for the $p_{i,1-s_i}$'s. For example, in some embodiments, for each i=1, . . . n:

1. the client randomly generates $e_i \in Z$ (at 430), then computes $y_i=x^{e_i}$ (at 440);

2. the client randomly generates $b_i \in G$ (at 450), then computes $z_i=b_i^{p_{1-s_i}}$ (at 460).

At 470, the client sends the values $y_i$, $z_i$ to the server. The server solves the discrete logarithm problems $DL_x y_i$ (mod $p_{i,s_i}$). The server thus determines $a_i=e_i$ mod $p_{i,s_i}$ from $y_i$ (at 474). In some embodiments, the discrete logarithm problem can be solved efficiently because it can be solved in a proper subgroup of G.

Figure 4:
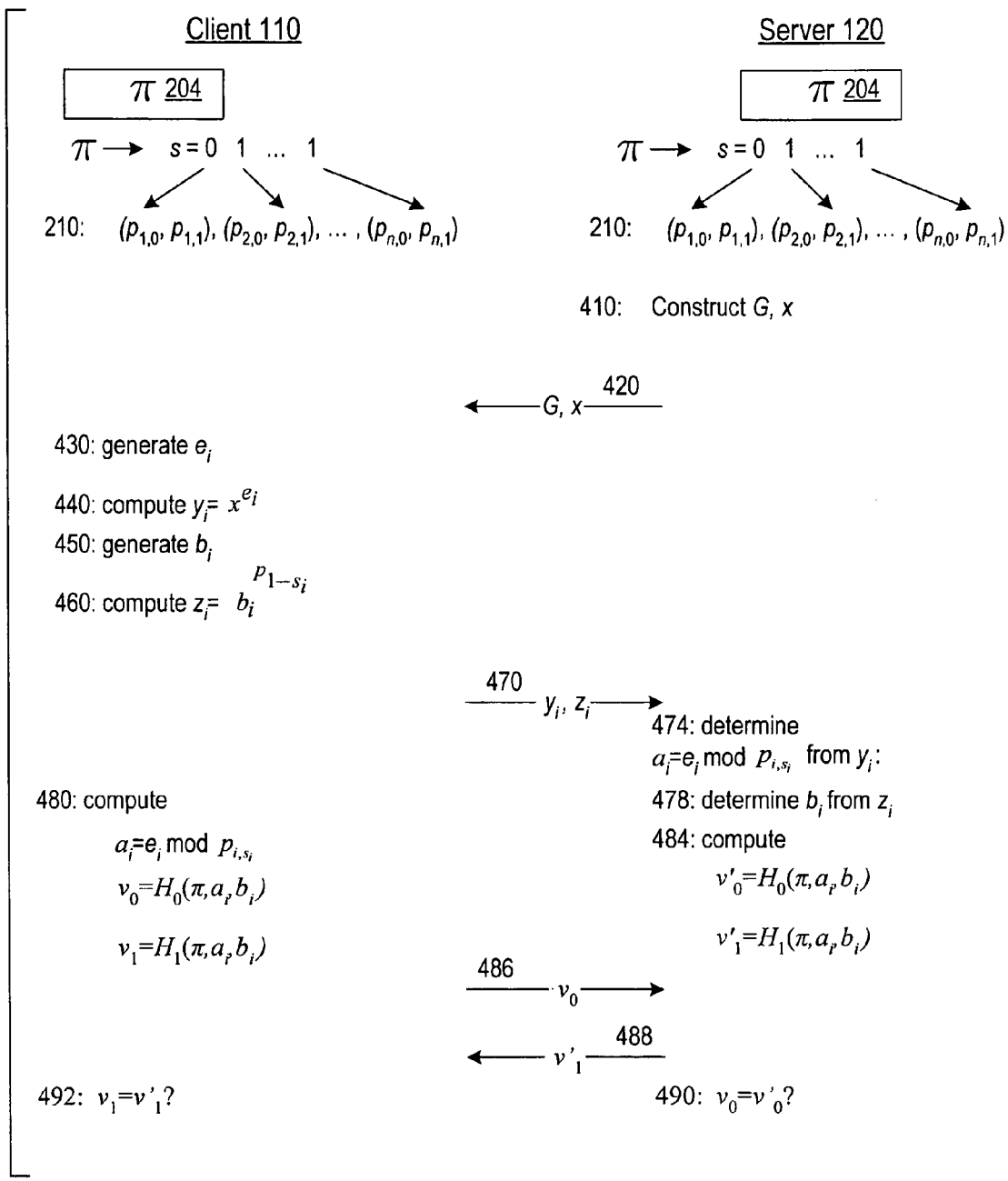
FIGS. 4 and 5 illustrate communication protocols according to some embodiments of the present invention.

The server performs root extraction to determine $b_i$ from $z_i$ (at 478). The answers $a_i$, $b_i$ will be unique only if the order of G is divisible by all $p_{i,s_i}$ but none of $p_{i,1-s_i}$, the same, and correspond to the same password. For example, both the client (at 480) and the server (at 484) apply two public hash functions $H_0,H_1$ to some values constructed from the respective client's and server's passwords. In the example of FIG. 4, the values are strings of the form $(\pi,a_i,b_i)$. (The client determines $a_i$ from the value $e_i$ generated at 430.) Separate such strings can be constructed for each i, or a single string can be formed which includes the $a_i$ and $b_i$ values for all i. Instead or in addition to the $a_i$ and $b_i$ values, the string may include some or all of the values $p_{i,s_i}$ or some or all of the values $p_{i,1-s_i}$. The function $H_0$ value is denoted in FIG. 4 as $v_0$ for the client and $v'_0$ for the server. The function $H_1$ value is denoted as $v_1$ for the client and $v'_1$ for the server. The client then sends $v_0$ to the server (at 486), and the server sends $v'_1$ to the client (at 488). The server considers the authentication step successful if the client's $v_0$ equals the server's $v'_0$ (step 490). Similarly, the client considers the authentication step successful if the client's $v_1$ equals the server's $v'_1$ (step 492). A shared authentication key sk can be generated by the client and the server as a function of the values $p_{i,s_i}$ or $p_{i,1-s_i}$, and/or of values $a_i$, $b_i$, $\pi$, and/or some other values (this step is not shown in FIG. 4). The key sk can be generated as a hash function, and in some embodiments the values $v_0$, $v'_0$, $v_1$, $v'_1$ are generated as hashes of the shared key sk, as described above in connection with FIG. 2.

In some embodiments, the discrete log and the root extraction are batched, so that the server performs a single discrete logarithm problem in a subgroup of G with order $P_\pi = \Pi_{i=1}^n p_{i,s_i}$ and computes a single $(\Pi_{i=1}^n p_{i,1-s_i})^{th}$ root of a group element. In some embodiments, the $p_{i,j}$'s are small primes, so the server can actually solve the discrete logarithm problem in the $(\Pi_{i=1}^n p_{i,s_i})$-order subgroup quite efficiently using, e.g., Pohlig-Hellman and the baby-step/giant-step algorithm ([48]). Security against malicious clients rests on a variant of the $\Phi$-hiding assumption of Cachin, Micali, and Stadler [11]—namely, roughly that given an appropriately-generated composite modulus N, it is hard to distinguish which of two numbers $P_1$ and $P_2$ divides $\phi(N)$, under the promise that exactly one of them does, where $P_1$ and $P_2$ will each be products of n of the primes, one from each pair.

Some embodiments of our scheme are efficient. We implemented some embodiments and ran experiments over a variety of computer processors. For 14-bit passwords (e.g., PIN numbers) mapped to 32-bit codewords (n=32), our scheme requires 26 (respectively 23) milliseconds of client (respectively server) computation on a 3.20 GHz Xeon processor; when used with an arbitrary dictionary of passwords mapped to 64-bit codewords, the scheme requires about twice as much computation for both the client and the server.

NOTATION RELATING TO THE SET OF PASSWORDS. Let $\Pi$ be the set of passwords $\pi$ in a dictionary, and let $f_\Pi:\Pi \to \{0,1\}^k$ be a function that maps passwords to strings of length k. For example, for PIN numbers, this may be the identity mapping, or for arbitrary dictionaries, this could be a collision-resistant hash function. Now, let $\alpha: \{0,1\}^k \to \{0,1\}^n$ be an error correcting code with distance d. Thus, $\alpha(f_\Pi(\pi))$ is the n-bit codeword corresponding to password $\pi$. We will denote this n-bit string by $s_\pi$.

NOTATION RELATING TO THE SET OF PRIMES. Let PP={$p_{1,0},p_{1,1}$, $p_{2,1},p_{2,1}, \ldots, p_{n,0},p_{n,1}$} be a set of 2n (l+1)-bit prime numbers (conceptually) divided into pairs. Let $P=\Pi_{p \in PP} p$. For string $s \in \{0,1\}^n$, let $\theta(s)$ equal $\{p_{i,s_i}:1 \leq i \leq n\}$, and let $P_s = \Pi_{p \in \theta(s)} p$. For each password $\pi$, let $P_\pi = P_{s_\pi}$, and let $P_{\bar{\pi}} = P_{\bar{s}_\pi}$, where $\bar{s}$ is the bit-wise complement of s—i.e., $\bar{s}_i = 1-s_i$ for $1 \leq i \leq n$. For a modulus N, define the prime set of N, denoted $PP_N$, to be the prime factors of $\phi(N)$ that are in PP. We call an element $x \in Z_N^*$ a quasi-generator with respect to PP if:

$$gcd(\phi(N)/|<x>|,P)=1. \qquad (1)$$

ERROR CORRECTING CODES. In some embodiments of our PAKE protocol, we use a binary error correcting code (ECC), and in particular, a BCH code [9,26] (see [35]). Here we define some terminology related to such codes.

An (n, k, d)-error correcting code maps k strings into n-bit codewords, such that the Hamming distance between any two codewords is at least d. (The Hamming distance between two bit strings a and b is the number of 1's in $a \oplus b$.) Such a code can correct $$\left\lfloor \frac{d}{2} \right\rfloor$$

errors. In some embodiments, however, we will not actually be correcting errors, and in fact, we will not be decoding codewords at all. We simply need to encode bit strings, and use the fact that any two codewords will have Hamming distance at least d.

HASH FUNCTIONS. We will use a hash function H for key generation and for producing verification values. For our security proofs, we assume the hash functions behave like black-box perfectly random functions, i.e., random oracles [3]. Although it has been shown that protocols secure in the random oracle model are not necessarily secure when the random oracle is instantiated by a real hash function [12], a proof of security in the random oracle model provides certain confidence in the security of a protocol.

SYSTEM MODEL. We assume for some embodiments that there is a set of clients Clients and a set of servers Servers. Our PAKE protocol will be run between a client C∈Clients and a server S∈Servers. In some embodiments, C 110 does not have to store any per-server information (such as a server certificate) nor any password data. C may simply store the description of a protocol, and any public parameters of that protocol. C may receive, as input 510 (FIG. 5), the password $\pi_C$ (denoted by $\pi$) and the identification S of the server with whom C will perform the PAKE protocol. The input 510 can be received from a user (such as Alice in FIG. 1). S stores a password file 514 consisting of a record $\lambda_S[C]$ for each C. This record may also include, for instance, a function of the password, or some other auxiliary data used for authenticating C in the PAKE protocol. (This assumption is actually for efficiency only. One could always implement the server by computing these values on-the-fly given simply the password.) Throughout this section, reference numerals such as 510, 514 may denote both values and physical computer storage containing these values.

We assume that clients and servers may execute the PAKE protocol multiple times with different partners, and we model this by allowing an unlimited number of (possibly concurrent) instances of the protocol for each participant. Instance i of client C is denoted $\Pi_i^C$, and instance j of server S is denoted $\Pi_j^S$.

2. Our Complexity Assumption for Some Embodiments

The invention is not limited to any complexity assumptions.

THE DECISION SUBGROUP ASSUMPTION. First, we state the complexity assumption on which the security of some PAKE embodiments is based: the assumed hardness of the "decision subgroup problem." Very roughly, our assumption is that if $N_{\pi_0}$ and $N_{\pi_1}$ are two composite (RSA-type) moduli generated in a "suitable way" such that for $i \in \{0,1\}$, $\theta(s_{\pi_i})$ is the prime set of $N_{\pi_i}$, it is hard to decide the value of b from $(\pi_0, \pi_1, PP, N_{\pi_b})$ if b is drawn uniformly at random from $\{0,1\}$. This assumption is a stronger version of the $\Phi$-hiding assumption of Cachin, Micali, and Stadler [11].

We make this assumption more formal as follows. As formalized, this assumption can apply not only to groups based on composite moduli, but to any group with a hidden smooth-order subgroup. (An integer n is called m-smooth if all the prime factors of n are less than or equal to m.) Let κ be the security parameter, PP be a set of primes and PP' be a non-empty subset of PP. Let $Gen(1^\kappa, PP, PP')$ be a group generation function with associated functions $f(\ )$ and $f'(\ )$ that, when $\Pi_{p \in PP} p \leq 2^{f(\kappa)}$ randomly generates a group whose order is (1) in the range $[2^{f(\kappa)-1}, 2^{f(\kappa)}]$, (2) divisible by $\Pi_{p \in PP'} p$, and (3) not divisible by any $p \in PP \backslash PP'$. (In other words, Gen induces a distribution on such groups.) Then for an adversary $A = (A_1, A_2)$, where $A_1(1^\kappa, PP)$ constructs two non-empty subsets $PP_0$, $PP_1 \in PP, \Pi_{p \in PP_0} p \leq 2^{f'(\kappa)}$ and $\Pi_{p \in PP_1} p \leq 2^{f'(\kappa)}$, along with some state $$Succ_A^{dsga}(\kappa, Gen, PP) = Pr\Big((PP_0, PP_1, s) \leftarrow A_1(1^\kappa, PP);$$

$$b \xleftarrow{R} \{0,1\}; G \leftarrow Gen(1^\kappa, PP, PP_b); A_2(s, G, PP, PP_0, PP_1) = b\Big),$$

and $$Adv_A^{dsga}(\kappa, Gen, PP) = 2 Succ_A^{dsga}(\kappa, Gen, PP) - 1.$$

We say $Adv^{dsga}(\kappa, Gen, PP, t)$ is the maximum over all adversaries A that run in time at most t of $Adv_A^{dsga}(\kappa, Gen, PP)$. (Here we assume t is a function of $\kappa$.) The (Gen,PP)-decision subgroup assumption states that $Adv^{dsga}(\kappa, Gen, PP, t)$ is negligible. For convenience, we will use the notation $Adv^{dsga}(t)$ instead of $Adv^{dsga}(\kappa, Gen, PP, t)$, with Gen as specified in Section 3 and PP implicit from the context. For the following discussion, let $\eta$ denote $f(\kappa)$ and $\rho$ denote $f'(\kappa)$.

One specific case where the (Gen,PP)-decision subgroup assumption is thought to be true is when $Gen(1^\kappa, PP, PP')$ generates multiplicative groups modulo RSA moduli constructed in a specific way, where $\eta$ is the RSA modulus size corresponding to a given security parameter $\kappa$ (see [34]), and $\rho < \eta/4$.

For example, consider the following method of generating N, where we will set $\rho + 2l < \eta/4$. The server generates a prime $Q_1$ of the form $2P_\pi R_1 u_1 + 1$ where $u_1$ is a small integer ($|u_1| = l$) and $R_1$ is a prime of the appropriate size to ensure that $|Q_1| = \eta/2$, which we assume to be greater than the size of any $p \in PP$. The server generates a prime $Q_2$ of the form $2R_2 u_2 + 1$ where, like above, $u_2$ is a small integer ($|u_2| = l$) and $R_2$ is a prime of the appropriate size to ensure that $|Q_2| = \eta/2$. (We could set $u_1 = u_2 = 1$, in which case $Q_2$ would be a safe prime—i.e., a prime of the form $2R_2 + 1$ for prime $R_2$—but generating $Q_1$ and $Q_2$ as above is substantially faster.) The server sets $N = Q_1 Q_2$. However, if $N \equiv 1 \mod p$ for any $p \in PP$, the server rejects N and starts over.

This construction of N guarantees that $P_\pi$ divides $\phi(N)$, since it divides $\phi(Q_1)$, and that $\gcd(P_\pi, \phi(N)) = 1$, since $P_\pi$ is relatively prime to $P_\pi$ (by definition), $R_1$ and $R_2$ (because they are primes larger than any $p \in PP$), and $u_1$ and $u_2$ (because they are both l bits, i.e., smaller than any $p \in PP$). By choosing $\rho + 2l < \eta/4$, and choosing $Q_1$ and $Q_2$ in this way, we guarantee that there is no obvious way to find a factor of $\phi(N)$ of size at least $\eta/4$. In particular, for any $u_1$ and $u_2$ of size l, the size of the factor $P_\pi u_1 u_2$ is less than $\eta/4$. Finally, we reject any $N \equiv 1 \mod p$ for any $p \in PP$ to avoid any obvious distinguishing attacks, since it will always be the case that $N \not\equiv 1 \mod p$ for $p \in \theta(s_\pi)$, but not necessarily for $p \in PP \backslash \theta(s_\pi)$.

The constraint that $\rho' = \rho + 2l < \eta/4$ is made to prevent attacks based on Coppersmith's method (see [14], [15], [38]), by which one can factor N if one knows a factor $P \geq N^{1/4}$ of $Q_1 - 1$ or $Q_2 - 1$. One security issue regarding this assumption is how much smaller $\rho'$ should be than $\eta/4$—i.e., how much degradation there is in the performance of Coppersmith's method (which is a latticed-based attack) when $\eta$ is made bigger in relation to $\rho'$. Since Coppersmith's method works well (in polynomial time) when $\rho' \geq \eta/4$, one might expect that the algorithm's performance declines only gradually—e.g., so that for $\eta/4 > \rho' \geq \eta/5$ the algorithm (while not polynomial-time) would be only slightly super-polynomial, perhaps because of the inefficiency of lattice reduction. As pointed out in [22], however, this is not true; when $\eta/\rho'$ is larger than 4, the target vector used in Coppersmith's method (i.e., the one that would help us factor the modulus) is not even the shortest vector in the lattice; thus, even perfect lattice reduction algorithms would not, by themselves, make the attack work. These considerations give us confidence that, as long as $\rho' < \eta/4$, and there is no way to easily guess (using PP') the existence of a subgroup of size $\eta/4$ or larger, we can safely instantiate the decision subgroup problem using RSA moduli as outlined above.

To gain further confidence in the decision subgroup assumption, we can consider its vulnerability to generic attacks. Generic attacks have been previously considered in groups of unknown order [18]. The decision subgroup assumption was also considered in this model by [22]. They show, roughly, that as the two distributions associated with the two sets of groups (based respectively on $PP_0$, $PP_1$) each tend to output a group G whose order is divisible by a large evenly-distributed prime, the decision subgroup problem is hard against generic attacks. In other words, the security of the decision subgroup problem against generic attacks depends less on the order of the subgroup H hidden in G than it does on the distribution of $|G:H|$.

3. Some Embodiments of Our Password Authenticated Key Exchange Scheme

PARAMETERS. We consider $\Pi$, $f_\Pi$, $\alpha$ and PP to be publicly available "parameters" of our scheme. The scheme also employs two cryptographic hash functions $H_0$ and $H_1$, which are modeled in the security proof as independent random oracles. The scheme may also employ an additional cryptographic hash function $H_2$ if the client desires a confirmation that the client's password is known to the server.

Figure 5:
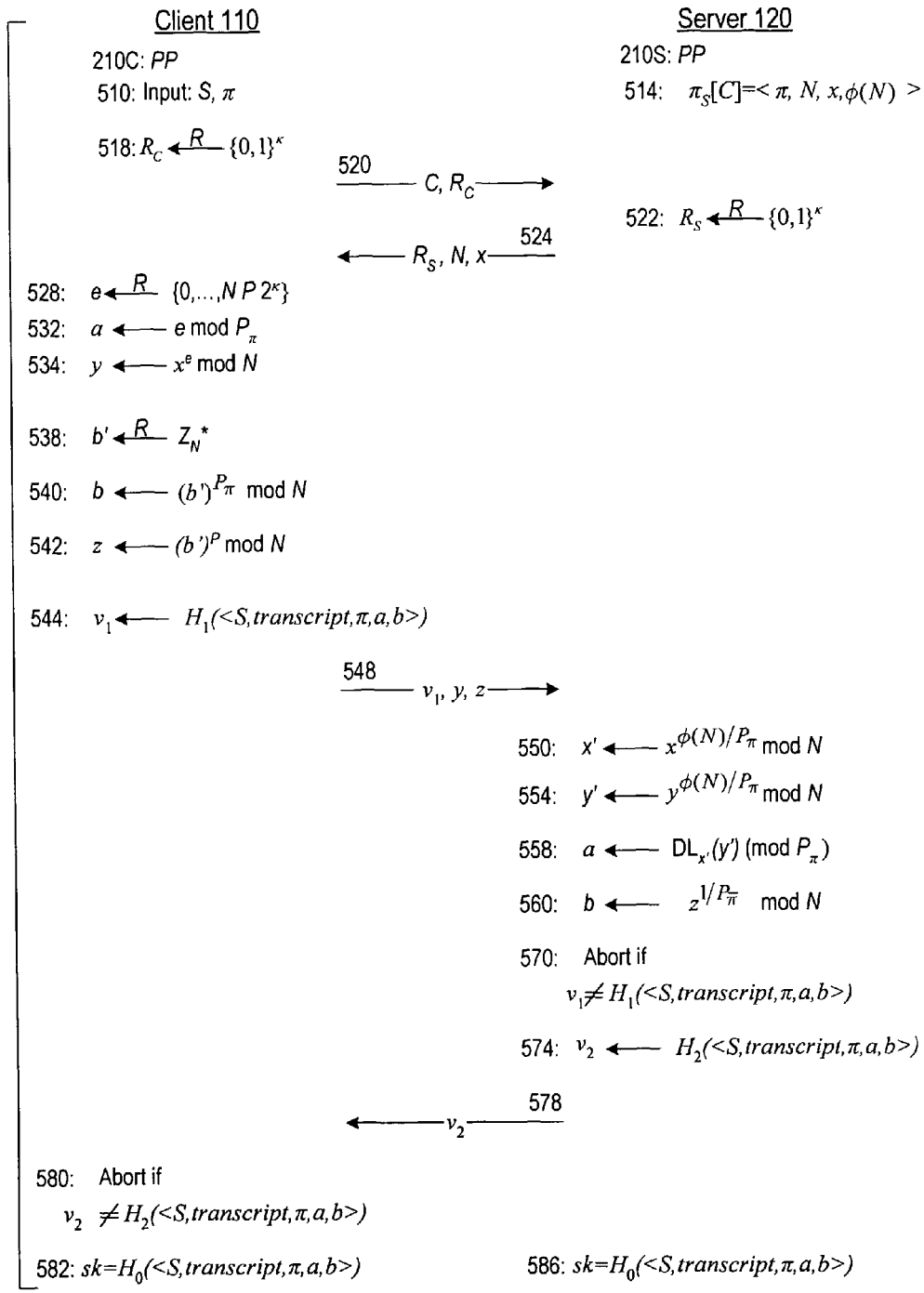

THE PROTOCOL. FIG. 5 gives the protocol. Here we give more details.

The client C and the server S each store, in their respective storage, the prime number set PP, as shown at 210C for the client and at 210S for the server. The client receives as input the password $\pi$ and the server identification S as shown at 510 and described above. The server stores the record $\pi_S[C]$ for the client, as shown at 514. This record includes the password $\pi$ and some other data described immediately below.

Server Initialization. The server generates a modulus N with prime set $\theta(s_\pi)$, the corresponding totient function value $\phi(N)$, and a quasi-generator $x \in Z_N^*$, according to the method described in Section 2. The server can store these values in record 514 so that they can be re-used in subsequent sessions with the same client.

Of note, the construction of N as in Section 2 guarantees the existence of a quasi-generator (assuming all the primes $p_{i,j}$ are distinct). Indeed, $\phi(N) = \phi(Q_1)\phi(Q_2) = 4P_\pi R_1 u_1 R_2 u_2$. Since $P_\pi$ is coprime to $4R_1 u_1 R_2 u_2$, each prime factor of $P_\pi$ occurs in the factorization of $\phi(N)$ in the first power. Therefore, $Z_N^*$ includes an element x of order $P_\pi$. Since $\phi(N)$ is coprime to $P_\pi, \phi(N)/P_\pi$ is coprime to P, so equation (1) holds for this x.

A quasi-generator can be chosen as any element x of $Z_N^*$ of order $P_\pi$, and can be generated as follows. Pick an element g of $Z_N^*$ at random, and set $x = g^{\phi(N)/P_\pi}$. Clearly, $x^{P_\pi} = 1$. Check that $x^{P_\pi/p} \neq 1$ for all the prime factors p of $P_\pi$. If this condition is true, then x is a quasi-generator. Otherwise, pick another random g and repeat the procedure.

Client First Action. To initiate a session, the client generates a random nonce $R_C \in \{0,1\}^\kappa$ (step 518), and sends its identity C and the nonce value to the server (at 520). Of note, the nonce values and ranges, the use of nonce values, and many other particulars are exemplary and not limiting.

Server First Action. The server generates a random nonce $R_S \in \{0,1\}$ (at step 522), and sends N, x and the nonce value to the client (at 524). In [22], it is shown that if the decision subgroup problem is hard, it remains hard when the problem instance also includes a quasi-generator x. Thus (informally) one can say that sending N and x reveals no information that could help in determining the password $\pi$.

(For the security analysis provided below, we can define the session ID sid=C‖S‖$R_C$‖$R_S$. We can define Partner ID for C as $pid_C$=S, and Partner ID for S as $pid_S$=C.)

Client Second Action. The client constructs a discrete logarithm problem instance y with answer a (in the subgroup of order $P_\pi$) as follows:

Step 528: generate a random value e in the range $[0, N \cdot P \cdot 2^\kappa]$. The use of this range is optional, as other ranges can also be used (e.g. other ranges greater than $P_\pi$).

Step 532: compute a←e mod $P_\pi$ (thus, the value a is the least non-negative integer congruent to e modulo $P_\pi$).

Step 534: compute y←$x^e$ mod N.

Thus, a=$DL_x$ y mod $P_\pi$.

The client also constructs a root extraction problem instance z (in the group $Z_N^*$) with answer b as follows:

Step 538: generate a random element b' of $Z_N^*$.

Step 540: compute b←$(b')^{P_\pi}$ mod N.

Step 542: compute z←$(b')^P$ mod N.

At step 544, the client computes a confirmation value $v_1 = H_1(<S, \text{transcript}, \pi, a, b>)$, where transcript is, or is dependent on, the transcript of messages sent between the client and the server. For example, the transcript can be the string <S, C, $R_C$, $R_S$, N, x>. The client thus proves its knowledge of $\pi$ explicitly. (The server, on the other hand, has already committed to a password guess implicit in its modulus N.) At 548, the client sends $v_1$, y and z to the server.

Server Second Action. The server solves the problems y and z to get answers a and b, respectively. More particularly, for the discrete logarithm problem:

Step 550: compute x'←$x^{\phi(N)/P_\pi}$ mod N.

Step 554: compute y'←$y^{\phi(N)/P_\pi}$ mod N

Step 558: compute a←$DL_{x'}(y')$ (mod $P_\pi$).

In some embodiments, the discrete logarithm (step 558) can be computed efficiently, since it is solved within a (smooth) cyclic subgroup <x'> in $Z_N^*$ of order $P_\pi$ (x' has order $P_\pi$ because x is a quasi-generator in $Z_N^*$; see equation (1)). In some embodiments, computing discrete logs in this subgroup is easy using the Pohlig-Hellman algorithm (see [48] and the Addendum below), since the prime divisors of $P_\pi$ are all small—e.g., l+1 bits, where the number l is quite small (e.g., 10). (See Section 3.1 for more details on how to choose l.)

The root extraction is performed at 560 by the server computing:

$$b \leftarrow z^{1/P_\pi} \bmod N$$

The root extraction can be performed efficiently in some embodiments since the server actually knows Euler's function $\phi(N)$. In particular, the value $1/P_\pi$ mod $\phi(N)$ can be computed using the extended Euclidian algorithm since $\gcd(P_\pi, \phi(N))=1$.

At 570, the server checks if the value $v_1$ received from the client is equal to $H_1((S, \text{transcript}, \pi, a, b))$. If not, the server aborts.

The server can provide the client with additional confirmation that the server knows the password $\pi$. For example, the server can compute a value $v_2 = H_2(<S, \text{transcript}, \pi, a, b>)$, see step 574, and the server can send this value to the client (at 578). At 580, the client checks if the value $v_2$ is equal to $H_2(<S, \text{transcript}, \pi, a, b>)$. If not, the client aborts.

In some embodiments, the additional confirmation (steps 574, 578, 580) is omitted. Alternatively, if the emphasis is on testing the server for the password knowledge (a trusted client but an untrusted server), step 570 can be omitted, and the client does not have to provide the value $v_1$ to the server at step 548.

Joint Session Key. The joint session key can be, for example, to sk=$H_0(<S, \text{transcript}, \pi, a, b>)$, computed by the client at 582 and by the server at 586.

In some embodiments, the session key is computed before the steps 544 and 574, and the values $v_1$, $v_2$ are computed as functions of the key (e.g. as hash functions $H_1$(sk), $H_2$(sk) respectively).

Intuitively, if N is constructed using the primes corresponding to the correct password (i.e., $\theta(s_\pi)=PP_N$) then (a,b) can be computed from (y,z). (This is shown explicitly below in the "Correctness" section.) However, if N were constructed with an "incorrect" set of primes, then for every "incorrect" prime, the possible (a,b) values the client could have used to compute (y,z) would increase by a multiplicative factor (equal to that prime). Then, as shown in Section 5, because of the error correcting code, the number of possibilities for (a,b) for a given (y,z) will be huge unless the client used the (at most) one password $\pi$ with $\theta(s_\pi)$ "closest" to $PP_N$.

Correctness. It suffices to show that the (a,b) values the server recovers are identical to the respective values the client generated. For b, since $\gcd(P_\pi, \phi(N))=1$, the root $z^{1/P_\pi}$ mod N exists and is unique in $Z_N$. Further, $$z^{1/P_\pi} = (b')^{P/P_\pi} = (b')^{P_\pi} = b \bmod N$$

(where b and b' are the values generated by the client at steps 538, 540).

To see that the a values are the same, we first write e as $a+mP_\pi$ for some integer m, where a is the client's value (step 532). Now, $$y' = y^{\phi(N)/P_\pi}$$
$$= x^{e\phi(N)/P_\pi}$$
$$= x^{(a+mP_\pi)\phi(N)/P_\pi}$$
$$= (x^{\phi(N)/P_\pi})^a \cdot x^{m\phi(N)}$$
$$= (x')^a \bmod N.$$

Therefore, the client's a value is one of the values $DL_{x'}(y')$. Since x is a quasi-generator and is a member of $Z_N^*$, the order of x' is $P_\pi$, and therefore $DL_{x'}(y')$ is unique modulo $P_\pi$. Therefore, since the server's and client's a values are both in $\{0, \ldots, P_\pi\}$ (see 532, 538), they must coincide. (Both x' and y' are in the $P_\pi$-order subgroup <x'> of $Z^*_N$.)

3.1. Instantiating the Error-Correcting Code

In order for our scheme to be both efficient and secure, the error-correcting code, and specifically, the (n, k, d) parameters, must be chosen carefully. (Note however that the invention is not limited to secure and efficient schemes.) Recall that n is the number of bits of a codeword, k is the number of bits of the input (i.e., the password representation), and d is the distance of the encoding (the minimum Hamming distance between any two codewords). Also of importance is the parameter l, since all primes in the hidden smooth subgroup <x'> of $Z^*_N$ must be of length at least l+1.

For flexibility, we would like k to be as large as possible, since we would like to be able to handle large dictionaries. (See Section 3.2 for further discussion of this.) To achieve at least the security of 4-digit PINs, we need k≧14.

For efficiency, we would like n(l+1) to be as small as possible (assuming the n primes used for the smooth subgroup are all l+1 bits, else this value would be larger), since this affects the size of the modulus, as discussed in Section 2. In particular, we need |N| to be at least four times this value, plus a comfortable margin, to avoid any known attacks. Alternatively, we could generalize the protocol to use multiple moduli, splitting the n bits of the codeword (along with their corresponding primes) among these different moduli, and simply requiring that the size of each modulus is at least four times n'(l+1), where n' is the number of bits assigned to that modulus. (Since modular exponentiations take time cubic in the size of the modulus, this alternative can often be more efficient.)

For security against an adversary posing as a client, we need to make sure the adversary cannot break the decision subgroup assumption, and thus, as discussed above, $|N| \geq \eta$. (For $\kappa=80$, $\eta \geq 1024$ (see [34]).)

For security against an adversary posing as a server, we need to make sure the adversary cannot construct a modulus that allows it to test the correctness/incorrectness of two candidate passwords simultaneously. We analyze the security as follows.

By our construction, each bit of the codeword corresponds to the inclusion of one (l+1)-bit prime and exclusion of a different (l+1)-bit prime. Since the distance between codewords is d, this implies that two codewords differ in the inclusion/exclusion of 2d primes. This means that any modulus chosen by the adversary is within less than d inclusion/exclusions of at most one codeword. As we will see in the proof of security, if the adversary wants to test for the correctness/incorrectness of a password, for every incorrectly guessed inclusion or exclusion, at least l-bits must be guessed by the adversary. Thus to test two passwords, one password will be at least d inclusions/exclusions away, and the adversary must guess dl bits. To achieve $\kappa$ bits of security, we need $dl > \kappa$.

In summary, we need to obtain an (n,k,d)-ECC and a value l such that $dl \geq \kappa$;
n(l+1) is minimized;
$k \geq 14$ is maximized;
$|N| > \max \{z(\kappa), 4n(l+1)\}$.

Table 1 below gives parameters for known codes (which are all BCH codes with a parity bit added), corresponding l values to satisfy our first requirement, along with the size of the modulus (or moduli) necessary for security at the $\kappa=80$ level. Multiple moduli are indicated by a number in parentheses after the size of the modulus. The size of the moduli have been rounded to a multiple of 256. We have examined other parameters, but they give worse performance.

TABLE 1

| (n, k, d)   | l  | \|N\|     |
|-------------|----|-----------|
| (64, 39, 10)| 8  | 1536(2)   |
| (64, 39, 10)| 8  | 1024(3)   |
| (32, 16, 8) | 10 | 1536      |
| (32, 16, 8) | 10 | 1024(2)   |
| (64, 45, 8) | 10 | 1536(2)   |
| (64, 45, 8) | 10 | 1280(3)   |
| (64, 45, 8) | 10 | 1024(4)   |
| (32, 21, 6) | 14 | 1280(2)   |
| (64, 51, 6) | 14 | 1536(3)   |
| (64, 51, 6) | 14 | 1280(4)   |

For PIN security, the (32, 16, 8)-ECC with l=10 and |N|=1536 seems to be a good choice. For security with arbitrary dictionaries (discussed in Section 3.2), the (64, 45, 8)-ECC with l=10 and two 1536-bit moduli seems to be a good choice.

3.2. Arbitrary Dictionaries

Now we consider the function $f_\Pi$ which maps passwords to bit strings. If there is a one-to-one mapping, then we obtain full security against online dictionary attacks, meaning that for q online authentication attempts and dictionary D, the probability of success is at most negligibly more than q/|D|. For instance, when 4-digit PIN numbers are used, $f_\Pi$ can simply map these numbers into length 14 bit strings corresponding to their numeric value between 0 and 9999. On the other hand, given a dictionary containing arbitrary length strings, there may not be a trivial mapping. Instead, we rely on a hash function to hash strings to k-bits. Then these k-bits can be used as input to the error-correcting code.

Unfortunately, collision resistant hash functions require a large output size. For instance, SHA-1 outputs 160 bits. A version of SHA-1 truncated to the number of bits we need for an efficient code, say k=45, will not necessarily be collision resistant. Thus our security may be reduced. Here we give some analysis to show that we still maintain a reasonably high level of security. Basically, the bit security will be on the order of the minimum of k and the log of the dictionary size, which is as good as one could hope for. (Note that when the dictionary size is much larger than $2^k$, by a strict interpretation one could say that we do not have a secure PAKE protocol. However, if one considers that we are essentially changing the password space from D to the set of k-bit strings, then under the new password space, one could say we have a secure PAKE protocol. Of course, we recommend this only for large k, such as k>30.)

First recall the Chernoff bound. Given n experiments with probability p of success, and X as a random variable denoting the number of successes, $$Pr(X > (1+\gamma)np) \leq \left(\frac{e^\gamma}{(1+\gamma)^{1+\gamma}}\right)^{np}.$$

In our scenario we may assume a dictionary of size at most $2^a$ and a random function $f_\Pi$ with k-bit output, and an experiment $(i,\pi)$ is whether $f_\Pi(\pi)=i$. This is essentially a balls-in-bins argument with the passwords representing the balls, and the $2^k$ outputs representing the bins. Then $n=2^a$ and $p=2^{-k}$. For convenience, let $\gamma=c2^{k-a}-1$, so that we are bounding the probability that a bin has greater than c balls. Then we have $$Pr(X > c) \leq e^{-2^{a-k}} \left(\frac{e}{c2^{k-a}}\right)^c \leq \left(\frac{e}{c2^{k-a}}\right)^c.$$

We can bound the probability that any bin has greater than c balls (i.e., the probability that any output is mapped to by more than c passwords) by the value $2^k Pr(X>c)$. We would like this value to be at most $c2^{-a}$, since that is the eventual probability that one k-bit output will correspond to the correct password, assuming that at most c passwords are mapped to any given output. Thus we need $$c2^{-a} \geq 2^k \left(\frac{e}{c2^{k-a}}\right)^c,$$

which can be reduced to $$c(\log c(1+c^{-1})+k-a) \geq a+k+c \log e.$$

The three BCH codes in the table above that could be used for arbitrary dictionaries have either k=39, k=45, or k=51. As an example, take k=45, and a dictionary of size $2^{35}$ (i.e., a=35, or roughly 32 billion). Then one needs $c \geq 7$, to make sure that the probability that an output word is mapped to by more than 7 passwords is at most $7/2^{35}$, and thus one achieves about 32-bit security.

Figure 6:
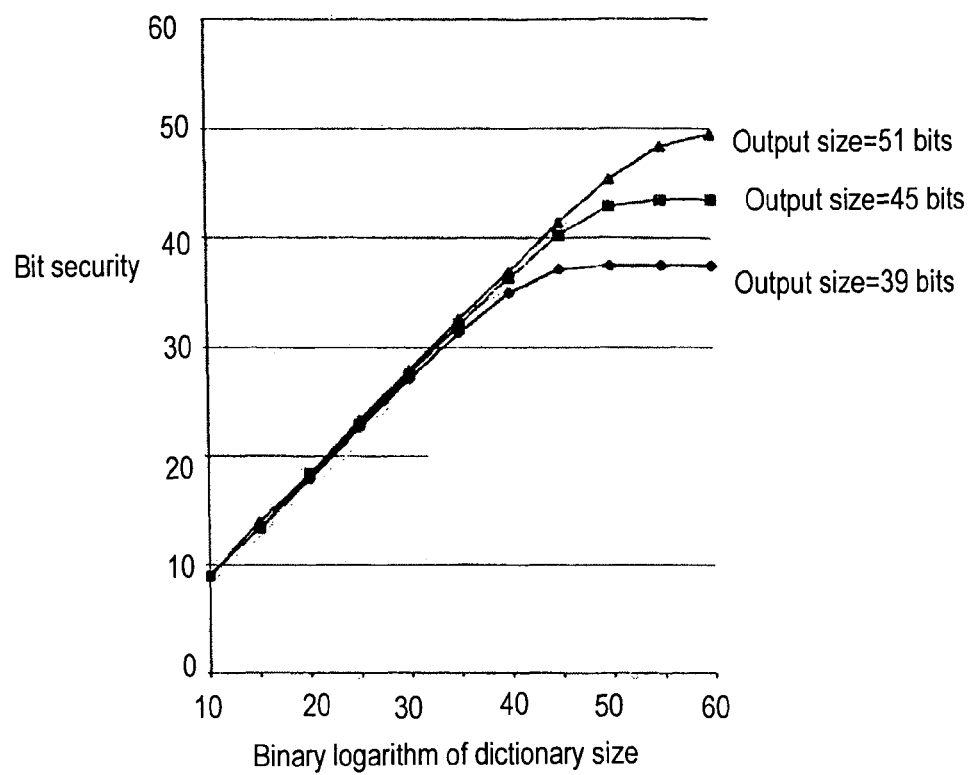
FIG. 6 is a graph of bit security versus dictionary size for some embodiments of the present invention.

FIG. 6 shows the bit security achieved for each k value, ranged over reasonable dictionary sizes. The binary logarithm of the dictionary size is plotted on the horizontal axis, and the bit security on the vertical axis. The bottom curve is for the output size of 39 bits. The middle curve is for the output size of 45 bits. The top curve is for the output size of 51 bits. Notice that in general, the bit security is reduced by a small constant for smaller values of a, but as a approaches k, the bit security levels off, and eventually becomes about k−log e (i.e., roughly k−1.44).

4. Implementation

To test the efficiency of our protocol, we implemented a demonstration version that runs both the client and server sides of the protocol on a single machine (thus disregarding communication costs). This implementation was written in C using the GNU MP library for the multi-precision arithmetic. The OpenSSL library was used for the cryptographic hash functions and cryptographic random number generation.

We obtained the following results using a (32, 16, 8)-ECC with l=10 and a 1536-bit modulus. As discussed above, this would be suitable for the case of 4-digit PIN numbers. Although we have not run experiments for a (64, 45, 8)-ECC with two 1536-moduli, which could handle arbitrary size dictionaries, it is clear that it would essentially double the computation cost for both the client and server.

To increase performance we used the following optimizations.

The server performed exponentiations over the composite modulus N using the knowledge of the two prime factors of N and the Chinese-remainder theorem (as is done often for RSA decryption).

The smooth subgroup was placed as a subgroup of only one of the factors of N, and thus all computations involved in computing discrete logs could be performed modulo that one factor, instead of N.

A recursive algorithm was used for determining the 32 small DL problems from the large DL problem of computing $a \equiv DL_{x'}(y')(\bmod P_\pi)$. This is described below.

The baby-step/giant-step algorithm was used for computing the discrete logarithms.

We performed twenty-five runs of the protocol execution on each machine, and averaged the computation times.

| (32, 16, 8)-ECC, l = 20, |N| = 1536 | | |
|---|---|---|
| | Client (msec) | Server (msec) |
| Xeon 3.20 GHz | 26 | 23 |
| Pentium M 2.00 GHz | 46 | 45 |
| Celeron 2.66 GHz | 100 | 86 |

The major computation cost for the client is the exponentiation over a 1536-bit modulus with an exponent that is more than 1536 bits. The major computation cost for the server is roughly evenly split between determining the 32 DL problems, and then solving those problems.

These performance numbers indicate that a server with a Xeon processor running at 3.2 GHz could process more than 40 authentication attempts per second. Obviously, as with any cryptographic protocol, denial-of-service (DoS) attacks should be considered. Fortunately, the server need not perform any cryptographic operations until it receives its second message, so attacks with spoofed IP addresses are of little concern. However, attacks from real IP addresses could still occur, and thus adequate protections (such as client-side puzzles [20]) should be built in to mitigate the effects of these attacks.

RECURSIVE ALGORITHM FOR COMPUTING SMALL DL PROBLEMS. The server has computed two values x' and y', and wants to compute $DL_{x'}(y') \bmod P_\pi$, where $P_\pi$ is the product of n (l+1)-bit primes. (In our case above, n=32 and l=10.) To do this efficiently, one can compute the discrete logarithm modulo $p_i$, for each prime $p_i$ that divides $P_\pi$. However the order of x' is $P_\pi$, and thus one should compute $x'_i \leftarrow (x')^{P_\pi/p_i} \bmod N$ and $y'_i \leftarrow (y')^{P_\pi/p_i} \bmod N$ (i.e., compute $x'_i$ and $y'_i$ by raising x' and y' respectively by the product of all primes except $p_i$), so that the order of $x'_i$ is $p_i$, and one can compute $DL_{x'_i}(y'_i)$ using a standard method (such as baby-step/giant-step) taking $O(\sqrt{p_i})$ steps.

So the object is to efficiently compute $x'_i$ and $y'_i$ for each i. The naive way requires n exponentiations over base N with exponents of size roughly (n−1)/(l+1) (or about 32 exponentiations with each exponent about 31·11=341 bits in our case). A much faster way is to compute the $x'_i$ and $y'_i$ values using a recursive algorithm. We focus on $x'_i$ values; the $y'_i$ values are similar. Split the product of primes into two products, the first half and the second half. Raise x' to each product, and call these $x'_{low}$ and $x'_{high}$. Then recursively solve the problem of computing the first half of the $x'_i$ values starting with $x'_{high}$, and the second half of the $x'_i$ values starting with $x'_{low}$. Note that each $x'_i$ value will eventually be x' raised to all $p_j$ values where $j \neq i$.

5. Security Model and Theorem

We describe our security model and provide a formal theorem statement regarding security for any given choice of system parameters κ, n, d, k, and l.

SECURITY MODEL. For our proofs of security we use the model of [2] (which builds on [4] and [5], and is also used by [31]; however, for simplicity, we will not consider the issues of providing explicit authentication or dealing with corruption of parties). This model is designed for the problem of authenticated key exchange (ake) between two parties, a client and a server, that share a secret. The goal is for them to engage in a protocol such that after the protocol is completed, they each hold a session key that is known to nobody but the two of them.

In the following, we will assume some familiarity with the model of [2].

Protocol participants. Let ID be a nonempty set of principals, each of which is either a client or a server. Thus $$ID \stackrel{def}{=} Clients \cup Servers,$$

where Clients and Servers are finite, disjoint, nonempty sets. We assume each principal $U \in ID$ is labeled by a string, and we simply use U to denote this string.

Each client $C \in Clients$ has a secret password $\pi_C$ and each server $S \in Servers$ has a vector $\pi_S = \langle \pi_S[C] \rangle_{C \in Clients}$. Entry $\pi_S[C]$ is the password record. (Note that $\pi_S[C]$ may contain more information than simply $\pi_C$.) Let Password$_C$ be a (possibly small) set from which passwords for client C are selected. We will assume that $$\pi_C \xleftarrow{R} \text{Password}_C$$

(but our results easily extend to other password distributions). Clients and servers are modeled as probabilistic poly-time algorithms with an input tape and an output tape.

Execution of the protocol. A protocol P is an algorithm that determines how principals behave in response to inputs from their environment. In the real world, each principal is able to execute P multiple times with different partners, and we model this by allowing unlimited number of instances of each principal. Instance i of principal U∈ID is denoted $\Pi_i^U$.

To describe the security of the protocol, we assume there is an adversary A that has complete control over the environment (mainly, the network), and thus provides the inputs to instances of principals. Formally, the adversary is a probabilistic algorithm with a distinguished query tape. Queries written to this tape are responded to by principals according to P; the allowed queries are formally defined in [2] and summarized here:

Send (U,i,M): sends message M to instance $\Pi_i^U$. The instance computes what the protocol says to, state is updated, and the output of the computation is given to A. If this query causes $\Pi_i^U$ to accept or terminate, this will also be shown to A. (Recall that accepting implies generating a triple (pid, sid, sk), terminating implies accepting and no more messages will be output. To indicate the protocol not sending any more messages, but not terminating, state is set to DONE, but term is set to FALSE.) To initiate a session between client C and server S, the adversary should send a message containing the server name S to an unused instance of C.

Execute (C,i,S,j): executes P to completion between $\Pi_i^C$ (where C∈Clients) and $\Pi_j^S$ (where S ∈ Servers), and outputs the transcript of the execution. This query captures the intuition of a passive adversary who simply eavesdrops on the execution of P.

Reveal (U,i): outputs the session key held by $\Pi_i^U$.

Test (U,i): causes $\Pi_i^U$ to flip a bit b. If b=1 the session key sk$_U^i$ is output; otherwise, a string is drawn uniformly from the space of session keys and output. A Test query may be asked at any time during the execution of P, but may only be asked once.

Partnering. A client or server instance that accepts holds a partner-id pid, session-id sid, and a session key sk. Then instances $\Pi_i^C$ (with C∈Clients) and $\Pi_j^S$ (with S∈Servers) are said to be partnered if both accept, they hold (pid, sid, sk) and (pid, sid, sk), respectively, with pid=S, pid=C, sid=sid, and sk=sk, and no other instance accepts with session-id equal to sid.

Freshness. An instance $\Pi_i^U$ is fresh unless either (1) a Reveal (U,i) query occurs, or (2) a Reveal (U',j) query occurs where $\Pi_i^U$, is the partner of $\Pi_i^U$.

Advantage of the adversary. We now formally define the authenticated key exchange (ake) advantage of the adversary against protocol P. Let Succ$_P^{ake}$(A) be the event that A makes a single Test query directed to some fresh instance $\Pi_i^U$ that has terminated, and eventually outputs a bit b', where b'=b for the bit b that was selected in the Test query. The ake advantage of A attacking P is defined to be $$Adv_P^{ake}(A) \stackrel{def}{=} 2Pr[Succ_P^{ake}(A)] - 1.$$

The following fact is easily verified.
Fact 1.

$$Pr\left(Succ\frac{ake-nfs}{P}(A)\right) = Pr\left(Succ\frac{ake}{P'}(A)\right) + \epsilon \Leftrightarrow Adv\frac{ake}{P}(A)$$
$$= Adv\frac{ake}{P'}(A) + 2\epsilon.$$

SECURITY THEOREM. Having provided the model, we now precisely state our security theorem. To precisely quantify the concrete security loss in the reduction, the theorem statement refers to three quantities: $t_{prot}, t_{samp}, t_{exp}$. These are respectively the time required for a single protocol execution, the time to sample a random element of the group G over which the protocol is executed, and the time to perform an exponentiation in that group.

Theorem 1. Let P be the protocol described in FIG. 5, steps 518-570, and with a password dictionary D and $f_\Pi$ a one-to-one mapping into $\{0,1\}^k$. Fix an adversary A that runs in time t, and makes $n_{se}, n_{ex}, n_{re}$ queries of type Send,Execute,Reveal, respectively, and $n_{ro}$ queries to the random oracles. Then for t'=O(t+(n$_{se}$+n$_{ex}$)t$_{prot}$+t$_{samp}$+n·t$_{exp}$):

$$Adv_P^{ake-nfs}(A) = \frac{n_{se}}{|D|} + O\left(n_{se}Adv^{dsga}(t') + \frac{n_{ro}}{2^{df}} + \frac{(n_{ro}+n_{se}+n_{ex})^2}{2^{2\kappa}}\right).$$

We remark that if $f_\Pi$ is a random mapping to $\{0,1\}^k$, then the first term becomes $(n_{se}+1)2^{-\delta}$, where δ is the bit security computed in Section 3.2, and the extra additive $2^{-\delta}$ comes from the probability that more than a $2^{-\delta}$ fraction of passwords map to any given k-bit string.

Proof (Sketch) We first introduce a series of protocols $P_0$, $P_1, \ldots, P_6$ related to P, with $P_0$=P. In $P_6$, A will be reduced to a simple online guessing attack that will admit a straightforward analysis.

$P_0$ The original protocol P.

$P_1$ If honest parties randomly choose $R_C$ or $R_S$ values seen previously in the execution of the protocol, the protocol halts and the adversary fails.

$P_2$ The protocol answers Send and Execute queries without making any random oracle queries. Subsequent random oracle queries by the adversary are backpatched, as much as possible, to be consistent with the responses to the Send and Execute queries. Note that the server will abort on non-matching sessions if it receives a v value for which the adversary has not made a correct random oracle $H_1(\cdot)$ query. Also the simulation halts and the adversary succeeds if it makes a correct random oracle query to determine the session key or verification value of a party. (This is a standard technique for proofs involving random oracles.)

$P_3$ If an "almost correct" password guess is made against a server instance (determined by a verification value v sent to the server instance, where v is equal to the output of an $H_1(\cdot)$ query with a correct password, regardless of the a and b values), the protocol halts and the adversary automatically succeeds.

$P_4$ Server instances use a dummy password to compute the modulus N for each client.

P5 If an $H_0(\cdot)$ or $H_1(\cdot)$ query is made, it is not checked for consistency against Execute queries. That is, instead of aborting the simulation, a random response is returned from the query.

P6 If the adversary makes two password guesses against the same client instance, the protocol halts and the adversary fails.

For each i from 1 to 6, we need to prove that the advantage of A attacking protocol $P_{i-1}$ is at most negligibly more than the advantage of A attacking protocol $P_i$. The proofs concerning the first three "transitions" are relatively straightforward. For the transition from $P_3$ to $P_4$, we use the hardness of the decision subgroup problem. For the transition from $P_4$ to $P_5$, and from $P_5$ to $P_6$, we use the following assertion.

Assertion 1. Take a modulus N and $x \in Z^*_N$. Take a password $\pi$. Let PP' be the set of primes that are in either $P_N$ or $\theta(s_\pi)$, but not both, and let $d=|PP'|$. Then for any $(y,z)$ produced by the client, the probability that $(a,b)$ was produced along with $(y,z)$ is at most $(1+2^{-\kappa})2^{-dt}$.

Roughly speaking, this assertion implies that if the server chooses its modulus N such that the set difference of $PP_N$ and $\theta(s_\pi)$ has large cardinality, then the server cannot feasibly retrieve the "correct" value of $(a,b)$ from $(y,z)$ because a huge number (about $2^{dt}$) of pairs $(a,b)$ all correspond to same $(y,z)$.

Proof For given $(N,x,\pi)$, the value of a is independent of the values of b and z, while the value of b is independent of the values of a and y; thus, $\Pr[(a,b)|(y,z)]=\Pr[a|y]\Pr[b|z]$.

First, we bound $\Pr[a|y]$. Let $PP_{\pi\text{-}N=\theta(S\pi)}\backslash PP_N$ (i.e., the set of primes in $\theta(s_\pi)$ but not $PP_N$), and let $P_{\pi\text{-}N}$ be the product of the primes in $PP_{\pi\text{-}N}$. Intuitively, since $\phi(N)$ is relatively prime to $P_{\pi\text{-}N}$, the value of y (which constrains the possible values of e mod $\phi(N)$) does not really constrain the value of e mod $P_{\pi\text{-}N}$ when e is taken from a large-enough interval, and consequently a←e mod $P_\pi$ can assume $P_{\pi\text{-}N}$ different values with essentially equal probability. More formally, let $|\langle x \rangle|$ be the order of x modulo N. Let $E_y = \{e_y \in \{0, \ldots, NP2^\kappa\} : y = x^{e_y} \mod N\}$ Then, $\Pr[a|y]=\Pr[e_y \equiv a \mod P_\pi | e_y \in E_y] \leq \Pr[e_y \equiv a \mod P_{\pi\text{-}N} | e_y \in E_y]$. Since the values of $E_y$ form an arithmetic progression with difference $|\langle x \rangle|$, and since $|\langle x \rangle|$ is relatively prime to $P_{\pi\text{-}N}$, the values of $E_y$ cycle (with period $P_{\pi\text{-}N}$) repeatedly through all residues modulo $P_{\pi\text{-}N}$, and we obtain $\Pr[e_y \equiv a \mod P_{\pi\text{-}N} | e_y \in E_y] \leq \lceil |E_y|/P_{\pi\text{-}N}\rceil/E_y| \leq 1/P_{\pi\text{-}N}+1/|E_y|, \leq 1/P_{\pi\text{-}N}+1/P2^\kappa$, where the final equality follows from $|E_y| \geq \lfloor NP2^\kappa/|\langle x \rangle| \rfloor$ and $|\langle x \rangle| < N$. Thus, $\Pr[a|y] \leq 1/P_{\pi\text{-}N}+1/P2^\kappa \leq (1+2^{-\kappa})/P_{\pi\text{-}N}$.

Next, we bound $\Pr[b|z]$. Let $B_{all}=\{b' \in Z^*_N : z=(b')^P \mod N\}$. Let $b_0 \in Z^*_N$ be such that the cardinality of the set $B_0\{b' \in Z^*_N : (b')^{P_\pi}=b_0 \mod N \wedge z=b_0^{P_\pi} \mod N\}$ is maximized. Notice that $\Pr[b|z] \leq \Pr[b_0|z]|B_0|/|B_{all}|$. Let $u \in Z^*_N$ be a primitive $P_N$-th root of unity modulo N. Let $PP_{N\text{-}\pi}=PP_N\backslash\theta(s_\pi)$ (i.e., the set of primes in $PP_N$ but not $\theta(s_\pi)$), and let $P_{N\text{-}\pi}$ be the product of the primes in $PP_{N\text{-}\pi}$. Then, for $t \in [0, P_{N\text{-}\pi}-1]$, the values $b_t = b_0 u^{tP_\pi} \mod N$ are distinct and thus the sets $B_t = \{b' \in Z^*_N : (b')^{P_\pi}=b_t \mod N \wedge z=b_t^{P_\pi} \mod N\}$ are disjoint. Moreover, $|B_t|=|B_0|$, since $B_t = \{b' : b'/u' \in B_0\}$. Thus, $|B_{all}| \geq P_{N\text{-}\pi}|B_0|$ and $\Pr[b|z] \leq 1/P_{N\text{-}\pi}$.

Finally, we get that $\Pr[a|y]\Pr[b|z] \leq (1+2^{-\kappa})/P_{\pi\text{-}N}P_{N\text{-}\pi} \leq (1+2^{-\kappa})2^{-dt}$, since the primes in PP are greater than or equal to $2^l$. □

Finally, in $P_6$, it is easy to see that the adversary can make at most one password guess against each client and server instance. This adds $$\frac{n_{se}}{|D|}$$

to the probability that the adversary succeeds. If the adversary does not guess the password, then it is straightforward to show that the view of the adversary is independent of each fresh session key, and thus the probability of success from a Test query is exactly $$\frac{1}{2}.$$

Therefore $$Adv^{ake}_{P_6}(A) \leq \frac{n_{se}}{|D|}.$$

The theorem follows from this by adding in the advantage gained by the adversary between each protocol $P_{i-1}$ and its successor protocol $P_i$.

In conclusion, we note that we presented a password authenticated key exchange protocol some embodiments of which are provably secure against offline dictionary attacks in the random oracle model (based on the decision subgroup assumption). Our approach involved using the password to construct a multiplicative group of "partially" smooth order (i.e. an order "most" of whose prime factors are less than or equal to some smoothness parameter); this appears to be a new paradigm in the design of password-authenticated key exchange protocols (which typically involve using the password to encrypt the messages in a standard key exchange protocol or using the password to choose the parameters of a standard key exchange protocol). Our scheme has some similarity to a recent private information retrieval scheme [22]. See also Craig Gentry, Philip Mackenzie, Zulfikar Ramzan, "Password Authenticated Key Exchange Using Hidden Smooth Subgroups" in *ACM CCS* 2005, 2005, incorporated herein by reference.

The invention is not limited to the embodiments described above. For example, in some embodiments, the client and the server authenticate each other but do not generate a shared session key (if only plaintext communication is desired). For example, in the database 210, the pairs of numbers can be replaced with tuples of numbers. The OT queries 230 (FIG. 2) may select one number out of each tuple. The invention is not limited to the use of error correcting codes, or to any particular length of the numbers $p_{i,j}$, or to these numbers having the same length. The functions $H_0$, $H_1$, $H_2$ do not have to be cryptographic hash functions. The invention is not limited to any complexity assumptions. The value $\pi$ can be a portion of a password rather than a complete password. The invention is not limited to using nonce values, transcript values (FIG. 5), or other particulars. The invention is not limited to any representation of integers or residues. In particular, elements of $Z_N$ can be represented by integers in the range from 0 to N−1 or by their congruent integers in some other range. For example, at step 542, z can be replaced with z+N. Likewise, at steps 532 and 558, the value a can be replaced by $a-P_\pi$. The values $(y,z)$ at step 548 (FIG. 5) can be represented as $(2y,2z)$, i.e. doubled, or as $(y,y+z)$, or in some other form. Other embodiments and variations are within the scope of the invention, as defined by the appended claims.

Addendum

Pohlig-Hellman Algorithm

Let G be a cyclic group (such as $\langle x \rangle$ above) whose order n is a product of distinct primes p raised to respective powers e(p), i.e. $n = \prod_{p|n} p^{e(p)}$.

(In FIG. 5, n=$P_\pi$.) Let x be a generator of G, and y be an element of G. Denote n(p)=n/$p^{e(p)}$, $x_p$=$x^{n(p)}$, $y_p$=$y^{n(p)}$. To find a non-negative integer a satisfying the equation $x^a$=y, the following algorithm can be used.

1. For each prime factor p of n, find a(p) such that $x_p^{a(p)}$=$y_p$. This is a discrete logarithm problem in the group <$x_p$> of order $p^{e(p)}$.
2. Then use the Chinese remainder theorem to find a such that:
   a is congruent to a(p) mod $p^{e(p)}$ for all prime divisors p of n.

In particular, a can be set to:

$$a = \left(\prod_{p|n} a(p)d(p)n(p)\right) \bmod n$$

where d(p) is an integer such that d(p)n(p)≡1 mod $p^{e(p)}$.

REFERENCES

The following numbered references are incorporated herein by reference.

[1] M. Abdalla and D. Pointcheval. Simple password-based encrypted key exchange protocols. In *Proc. of CT-RSA* 2005, LNCS 3376, pp. 191-208. Springer, 2005.

[2] M. Bellare, D. Pointcheval and P. Rogaway. Authenticated key exchange secure against dictionary attacks. In *Proc. of Eurocrypt* 2000, LNCS 1807, pp. 139-155. Springer, 2000.

[3] M. Bellare and P. Rogaway. Random oracles are practical: a paradigm for designing efficient protocols. In *Proc. of ACM CCS* 1993, pp. 62-73. ACM, 1993.

[4] M. Bellare and P. Rogaway. Entity authentication and key distribution. In *Proc. of Crypto* 1993, LNCS 773, pp. 232-249. Springer, 1994.

[5] M. Bellare and P. Rogaway. Provably secure session key distribution: the three party case. In *Proc. of STOC* 1995, pp. 57-66. ACM, 1995.

[6] S. M. Bellovin and M. Merritt. Encrypted key exchange: password-based protocols secure against dictionary attacks. In *IEEE Symposium on Research in Security and Privacy*, pp. 72-84. IEEE, 1992.

[7] S. M. Bellovin and M. Merritt. Augmented encrypted key exchange: a password-based protocol secure against dictionary attacks and password file compromise. In *ACM CCS* 1993, pp. 244-250. ACM, 1993.

[8] D. Boneh. The decision Diffie-Hellman problem. In *Proc. of ANTS-III*, LNCS 1423, pp. 48-63. Springer, 1998.

[9] R. C. Bose and D. K. Ray-Chaudhuri. On a class of error correcting binary group codes. *Inf. Control*, 3, pp. 68-79, 1960.

[10] V. Boyko, P. MacKenzie and S. Patel. Provably secure password authentication and key exchange using Diffie-Hellman. In *Proc. of Eurocrypt* 2000, LNCS 1807, pp. 156-171. Springer, 2000.

[11] C. Cachin, S. Micali, M. Stadler, Computational private information retrieval with polylogarithmic communication. In *Proc. of Eurocrypt* 1999, LNCS 1592, pp. 402-414, Springer, 1999.

[12] R. Canetti, O. Goldreich and S. Halevi. The random oracle methodology, revisited. In *JACM*, vol. 51, no. 4, pp. 557-594. ACM, 2004. (Preliminary version appeared in STOC 1998, pp. 209-218.)

[13] R. Canetti, S. Halevi, J. Katz, Y. Lindell and P. MacKenzie. Universally-composable password-based key exchange. In *Proc. of Eurocrypt* 2005, LNCS 3494, pp. 404-421. Springer, 2005.

[14] D. Coppersmith, Finding a small root of a bivariate integer equation; factoring with high bits known. In *Proc. of Eurocrypt* 1996, LNCS 1070, pp. 178-189. Springer, 1996.

[15] D. Coppersmith, Finding a small root of a univariate modular equation. In *Proc. of Eurocrypt* 1996, LNCS 1070, pp. 155-165. Springer, 1996.

[16] R. Cramer and V. Shoup. A practical public key cryptosystem provably secure against adaptive chosen ciphertext attack. In *Proc. of Crypto* 1998, LNCS 1462, pp. 13-25. Springer, 1998.

[17] R. Cramer and V. Shoup. Universal hash proofs and a paradigm for chosen ciphertext secure public key encryption. In *Proc. of Eurocrypt* 2002, LNCS 2332, pp. 45-64. Springer, 2002.

[18] I. Damgard and M. Koprowski. Generic lower bounds for root extraction and signature schemes in general groups. In *Proc. of Eurocrypt* 2002, LNCS 2332, pp. 256-271. Springer, 2002.

[19] W. Diffie and M. Hellman. New directions in cryptography. *IEEE Trans. Info. Theory*, 22(6): 644-654, 1976.

[20] C. Dwork and M. Naor. Pricing via processing or combatting junk mail. In *Proc. of Crypto* 1992, LNCS 740, pp. 139-147. Springer, 1993.

[21] R. Gennaro and Y. Lindell. A framework for password-based authenticated key exchange. In *Proc. of Eurocrypt* 2003, LNCS 2656, pp. 524-543. Springer, 2003.

[22] C. Gentry and Z. Ramzan. Single-database private information retrieval with constant communication rate. In *Proc. of ICALP* 2005, pp. 803-814. Springer, 2005.

[23] O. Goldreich and Y. Lindell. Session-key generation using human passwords only. In *Proc. of Crypto* 2001, LNCS 2139, pp. 408-432. Springer, 2001.

[24] L. Gong. Optimal authentication protocols resistant to password guessing attacks. In *IEEE Computer Security Foundations Workshop*, pages 24-29. IEEE, 1995.

[25] L. Gong, T. M. A. Lomas, R. M. Needham and J. H. Saltzer. Protecting poorly chosen secrets from guessing attacks. In *IEEE Journal on Selected Areas in Communications*, 11(5): 648-656, June 1993.

[26] A. Hocquenghem. Codes corecteurs d'erreurs. *Chiffres*, 2, pp. 147-156, 1959.

[27] IEEE Standard 1363-2000, Standard specifications for public key cryptography, 2000.

[28] D. Jablon. Strong password-only authenticated key exchange. In *ACM Computer Communication Review, ACM SIGCOMM*, 26(5): 5-20, 1996.

[29] D. Jablon. Extended password key exchange protocols immune to dictionary attack. In *WETICE '97 Workshop on Enterprise Security*, pp. 248-255. IEEE, 1997.

[30] S. Jiang and G. Gong. Password based key exchange with mutual authentication. In *Proc. of SAC* 2004, LNCS 3357, pp. 267-279. Springer, 2004.

[31] J. Katz, R. Ostrovsky and M. Yung. Practical password-authenticated key exchange provably secure under standard assumptions. In *Proc. of Eurocrypt* 2001, LNCS 2045, pp. 475-494. Springer, 2001.

[32] C. Kaufman and R. Perlman. PDM: a new strong password-based protocol. In *Usenix Security Symposium*, 2001.

[33] T. Kwon. Authentication and key agreement via memorable passwords. In *Proc. of NDSS* 2001. ISOC; 2001.

[34] A. Lenstra and E. Verheul. Selecting cryptographic key sizes. In *Journal of Cryptology*, 14(4): 255-293, 2001.

[35] S. Lin and D. J. Costello, Jr. Error control coding: fundamentals and applications. Prentice Hall, Englewood Cliffs, N.J., 1983.

[36] S. Lucks. Open key exchange: How to defeat dictionary attacks without encrypting public keys. In *Proc. of Security Protocols Workshop*, LNCS 1361, pp. 79-90. Springer, 1998.

[37] P. MacKenzie, S. Patel and R. Swaminathan. Password authenticated key exchange based on RSA. In *Proc. of Asiacrypt* 2000, LNCS 1976, pp. 599-613. Springer, 2000.

[38] A. May. A tool kit for finding small roots of bivariate polynomials over the integers. In *Proc. of Eurocrypt* 2005, LNCS 3494, pp. 251-267. Springer, 2005.

[39] M. Naor and B. Pinkas. Oblivious transfer and polynomial evaluation. In *Proc. of STOC* 1999, pp. 245-254. ACM, 1999.

[40] National Institute of Standards and Technology (NIST). Announcing the Secure Hash Standard, FIPS 180-1, U.S. Department of Commerce, April, 1995.

[41] S. Patel. Number theoretic attacks on secure password schemes. In *Proc. of the IEEE Sym. on Research in Security and Privacy*, pp. 236-247, 1997.

[42] M. O. Rabin. How to exchange secrets by oblivious transfer. Unpublished manuscript, 1981.

[43] R. Rivest, A. Shamir, and L. Adleman. A method for obtaining digital signature and public key cryptosystems. In *Communications of the ACM*, 21:120-126, 1978.

[44] M. Steiner, G. Tsudik, and M. Waidner. Refinement and extension of encrypted key exchange. In *Operating System Review*, 29:22-30. ACM, 1995.

[45] T. Wu. The secure remote password protocol. In *Proc. of NDSS* 1998, pp. 97-111. ISOC, 1998.

[46] T. Wu. A real-world analysis of Kerberos password security. In *Proc. of NDSS* 1999, ISOC, 1999.

[47] M. Zhang. New approaches to password authenticated key exchange based on RSA. In *Proc. of Asiacrypt* 2004, LNCS 3329, pp. 230-244. Springer, 2004.

[48] J. A. Buchmann. Introduction to Cryptography ($2^{nd}$ ed., Springer-Verlag), pages 213-226.

The invention claimed is:

1. A computer-implemented cryptographic authentication method for at least one of first and second computer systems to prove knowledge of a predefined value $\pi$ to the other one of the first and second computer systems in execution of a predefined authentication protocol, the value $\pi$ being one of a predefined set of values $\Pi$;

the method comprising the first computer system performing the following operations in accordance with the authentication protocol:

(1) receiving, over a computer network, data representing positive integer values N and x whose absolute values are greater than 1, wherein the authentication protocol requires the values N and x to be generated outside of the first computer system and to depend on the value $\pi$;

wherein the authentication protocol requires each value in the set $\Pi$ to be associated with a subset $\theta$ of a predefined set PP of positive integers, the subset $\theta$ consisting of one or more of the positive integers, different values in the set $\Pi$ being associated with different subsets $\theta$, wherein a product of all of the one or more integers in a subset $\theta$ associated with any one of the values in the set $\Pi$ is different from a product of all of the one or more integers in a subset $\theta$ associated with any other one of the values in the set $\Pi$;

wherein the authentication protocol requires the second computer system to know at least one of (i) the subset $\theta$ associated with the value $\pi$, (ii) a product $P_\pi$ of all of the one or more integers in the subset $\theta$ associated with the value $\pi$, (iii) a product $P_{\bar{\pi}}$ of all of the one or more integers in the set PP but not in the subset $\theta$ associated with the value $\pi$;

(2) generating data representing an integer e and an integer b, where b is coprime to N;

(3) generating data which represent values y and z such that:

y is congruent to $x^e$ mod N; and z is congruent to $b^{P_{\bar{\pi}}}$ mod N;

(4) sending the data which represent the values y and z to the second computer system without sending, to the second computer system, data which represent any one or more of the values e, b, $P_\pi$, $P_{\bar{\pi}}$;

(5) performing at least one of the following operations (5A) and (5B):

(5A) receiving first proof data from the second computer system, and checking the first proof data to verify that the second computer system has obtained, from the values y and z:

(5A-1) an integer value a congruent to e mod $P_\pi$; and (5A-2) the value b;

(5B) sending second proof data to the second computer system, the second proof data being operable to prove to the second computer system that the first computer system knows the value a defined in (5A-1) and the value b.

2. The method of claim 1 comprising performing the operation (5B).

3. The method of claim 2 wherein the second proof data comprises an output of a cryptographic hash function on an input comprising the values a, b, and $\pi$.

4. The method of claim 1 wherein $P_\pi$ is coprime to $P_{\bar{\pi}}$.

5. The method of claim 1 wherein the operation (2) comprises the first computer system generating data representing a value b' which is coprime to N, wherein b is congruent to $(b')^{P_{\bar{\pi}}}$ mod N;

wherein the operation (3) comprises generating z from b' as a number congruent to $(b')^P$ mod N where P is the product of all the integers in the set PP.

6. The method of claim 5 wherein in operation (2), the integers e and b' are generated as random numbers.

7. A method for operating a network, the method comprising providing to the network from a non-transitory computer-readable storage medium, or transferring from the network to the non-transitory computer-readable storage medium, a computer program operable to cause implementation of the method of claim 1 by the first computer system executing the computer program.

8. A non-transitory computer-readable storage medium comprising one or more computer instructions for a computer system to perform operations (1) through (5) of the first computer system of the method of claim 1.

9. The method of claim 1 wherein the authentication protocol requires that:

the integer N's Euler's totient function $\phi(N)$ be divisible by $P_\pi$ and be coprime to $P_{\bar{\pi}}$; and an order of x in the multiplicative unit group $Z_N^*$ of the ring $Z_N$ of the least non-negative residues modulo N be divisible by $P_\pi$.

10. The method of claim 1 wherein in operation (2), the integer e is generated as a random number.

11. The method of claim 1 wherein the value $\pi$ represents at least a portion of a password of a user of the first computer system.

12. The method of claim 1 comprising the operation (5A), wherein the first proof data comprises an output of a cryptographic hash function on an input comprising the values a, b, and π.

13. The method of claim 1 further comprising the first computer system performing operations of:
mapping the value π into an n-bit codeword $s_\pi$ of a predefined error correcting code, wherein n is an integer greater to 1, the mapping operation being performed using a predefined mapping which, according to the authentication protocol, is known to the first and second computer systems and which associates each value ππ in the set Π with a codeword $s_{\pi\pi}$, wherein the subset θ associated with the value ππ is defined by the codeword $s_{\pi\pi}$.

14. The method of claim 1 wherein in accordance with the authentication protocol, the predefined set PP of positive integers consists of ordered pairs of the positive integers, wherein each value ππ in the set Π is associated with a unique bit-string $s_{\pi\pi}$ each bit of which corresponds to a single one of the ordered pairs and selects which of the two positive integers of the single one of the ordered pairs belongs to the subset θ associated with the value ππ.

15. The method of claim 1 wherein the integers in the predefined set PP are pairwise coprime.

16. The method of claim 15 wherein the set PP is generated independently of any value in the set Π.

17. The method of claim 15 wherein the set PP is generated as random.

18. The method of claim 1 wherein according to the authentication protocol, Euler's totient function ϕ(N) is divisible by $P_\pi$ but is coprime to $P_{\bar\pi}$.

19. The method of claim 18 wherein according to the authentication protocol, the value x is a quasi-generator of $Z_N^*$ with respect to the set PP.

20. A method for operating a network, the method comprising carrying, by the network, a computer program operable to cause implementation of the method of claim 19 by the first computer system, wherein the computer program is provided to the network from a non-transitory computer-readable storage medium.

21. A non-transitory computer-readable storage medium comprising one or more computer instructions for a computer system to perform operations (1) through (5) of the first computer system of the method of claim 19.

22. The method of claim 1 wherein the authentication protocol requires the second computer system to determine the values a and b from y and z using Euler's totient function ϕ(N).

23. An apparatus comprising circuitry for performing the method of claim 1.

24. A computer-implemented cryptographic authentication method for at least one of first and second computer systems to prove knowledge of a predefined value π to the other one of the first and second computer systems in execution of a predefined authentication protocol, the value π being one of a predefined set of values Π, the method comprising the second computer system performing the following operations in accordance with the authentication protocol:
(1) generating, from the value π, data representing a composite integer N and an integer x;
wherein the authentication protocol requires each value in the set Π to be associated with a subset θ of a predefined set PP of positive integers, the subset θ consisting of one or more of the positive integers, different values in the set Π being associated with different subsets θ, wherein a product of all of the one or more integers in a subset θ associated with any one of the values in the set Π is different from a product of all of the one or more integers in a subset θ associated with any other one of the values in the set Π;
wherein the authentication protocol requires the first computer system to know at least one of (i) the subset θ associated with the value π, (ii) a product $P_\pi$ of all of the one or more integers in the subset θ associated with the value π, (iii) a product $P_{\bar\pi}$ of all of the one or more integers in the set PP but not in the subset θ associated with the value π;
(2) sending the data representing the values N and x to the first computer system and receiving in response data representing integer values y and z, wherein the authentication protocol requires v to be congruent to $x^e$ mod N where e is an integer not provided to the second computer system;
(3) generating data representing a value a congruent to a logarithm of y' to base x' modulo $P_\pi$, where:
x' and y' are obtained from x and y; and
the authentication protocol requires the value a to be congruent to e mod $P_\pi$;
(4) generating data representing a value b congruent to a value $z^{1/P_{\bar p}}$ modulo N;
(5) performing at least one of the following operations (5A) and (5B):
(5A) sending first proof data to the first computer system, the first proof data being operable to prove to the first computer system that the second computer system knows the values a and b;
(5B) receiving second proof data from the first computer system, and checking the second proof data to verify that the first computer system knows the values a and b.

25. The method of claim 24 wherein the second computer system generates first data representing one or more prime factors of N and/or Euler's totient function ϕ(N) but does not provide such data to the first computer system;
wherein the second computer system uses the first data to generate the data representing the value b.

26. The method of claim 24 wherein $P_\pi$ divides Euler's totient function ϕ(N), and $P_\pi$ is coprime to $P_{\bar p}$.

27. The method of claim 26 wherein x is a quasi-generator of $Z_N^*$ with respect to the set PP.

28. A non-transitory computer-readable storage medium comprising one or more computer instructions for a computer system to perform operations (1) through (5) of the second computer system of the method of claim 27.

29. A method for operating a network, the method comprising carrying, by the network, a computer program operable to cause implementation of the method of claim 26 by the second computer system, wherein the computer program is provided to the network from a non-transitory computer-readable storage medium.

30. The method of claim 24 wherein x'=x and y'=y.

31. The method of claim 24 wherein $x'=x^u$ and $y'=y^u$, where u=ϕ(N)/$P_\pi$, where ϕ(N) is Euler's totient function.

32. The method of claim 24 wherein x is a quasi-generator of $Z_N^*$ with respect to PP.

33. A method for operating a network, the method comprising carrying, by the network, a computer program operable to cause implementation of the method of claim 24 by the second computer system executing the computer program, wherein the computer program is provided to the network from a non-transitory computer-readable storage medium.

34. A non-transitory computer-readable storage medium comprising one or more computer instructions for a computer system to perform operations (1) through (5) of the second computer system of the method of claim 24.

35. The method of claim 24 wherein:
the integer N's Euler's totient function $\phi(N)$ is divisible by $P_\pi$ and coprime to $P_{\bar{\pi}}$; and
an order of x in the multiplicative unit group $Z_N^*$ of the ring $Z_N$ of the least non-negative residues modulo N is divisible by $P_\pi$.

36. The method of claim 24 wherein the value $\pi$ represents at least a portion of a password of a user of the first computer system.

37. The method of claim 24 comprising the operation (5A), wherein the first proof data comprises an output of a cryptographic hash function on an input comprising the values a, b, and $\pi$.

38. The method of claim 24 comprising the operation (5B), wherein the second proof data comprises an output of a cryptographic hash function on an input comprising the values a, b, and $\pi$.

39. The method of claim 24 further comprising the second computer system performing operations of:
mapping the value $\pi$ into an n-bit codeword $s_\pi$ of a predefined error correcting code, wherein n is an integer greater to 1, the mapping operation being performed using a predefined mapping which, according to the authentication protocol, is known to the first and second computer systems and which associates each value $\pi\pi$ in the set $\Pi$ with a codeword $s_{\pi\pi}$, wherein the subset $\theta$ associated with the value $\pi\pi$ is defined by the codeword $s_{\pi\pi}$.

40. The method of claim 24 wherein in accordance with the authentication protocol, the predefined set PP of positive integers consists of ordered pairs of the positive integers, wherein each value $\pi\pi$ in the set $\Pi$ is associated with a unique bit-string $s_{\pi\pi}$ each bit of which corresponds to a single one of the ordered pairs and selects which of the two positive integers of the single one of the ordered pairs belongs to the subset $\theta$ associated with the value $\pi\pi$.

41. The method of claim 24 wherein the integers in the predefined set PP are pairwise coprime.

42. The method of claim 41 wherein the set PP is generated independently of any value in the set $\Pi$.

43. The method of claim 41 wherein the set PP is generated as random.

44. The method of claim 24 wherein each of the values a and b are determined by the second computer system using Euler's totient function $\phi(N)$.

45. An apparatus comprising circuitry for performing the method of claim 24.

46. A computer-implemented cryptographic authentication method for at least one of first and second computer systems to prove knowledge of a predefined value $\pi$ to the other one of the first and second computer systems and/or for generating a cryptographic key to be shared by the first and second computer systems in execution of a predefined authentication protocol, the value $\pi$ being one of a predefined set of values $\Pi$;
the method comprising the first computer system performing the following operations in accordance with the authentication protocol:
(1) receiving, over a computer network, data representing a description of a group G and of an element x whose order in the group G is greater than 1;
wherein the authentication protocol requires each value in the set $\Pi$ to be associated with a subset $\theta$ of a predefined set PP of positive integers, the subset $\theta$ consisting of one or more of the positive integers, different values in the set $\Pi$ being associated with different subsets $\theta$, wherein a product of all of the one or more integers in a subset $\theta$ associated with any one of the values in the set $\Pi$ is different from a product of all of the one or more integers in a subset $\theta$ associated with any other one of the values in the set $\Pi$;
wherein the authentication protocol requires the second computer system to know at least one of (i) the subset $\theta$ associated with the value $\pi$, (ii) a product $P_\pi$ of all of the one or more integers in the subset $\theta$ associated with the value $\pi$, (iii) a product $P_{\bar{\pi}}$ of all of the one or more integers in the set PP but not in the subset $\theta$ associated with the value $\pi$;
(2) generating data representing an integer e and an element b of the group G;
(3) generating data which represent elements y and z of the group G such that:
$y=x^e$; and
$z=b^{P_\pi}$;
(4) sending the data which represent the values y and z to the second computer system for the second computer system to generate data representing (i) an integer value a congruent to e mod $P_\pi$ and (ii) the element b;
(5) performing at least one of the following operations (5A) and (5B):
(5A) receiving first proof data from the second computer system, and checking the first proof data to verify that the second computer system has obtained, from the values y and z, the integer value a and the element b;
(5B) sending second proof data to the second computer system, the second proof data being operable to prove to the second computer system that the first computer system knows the integer value a and the value b.

47. A method for operating a network, the method comprising carrying, by the network, a computer program operable to cause implementation of the method of claim 46 by the first computer system, wherein the computer program is provided to the network from a non-transitory computer-readable storage medium.

48. A non-transitory computer-readable storage medium comprising one or more computer instructions for a computer system to perform operations (1) through (5) of the first computer system of the method of claim 46.

49. The method of claim 46 wherein the authentication protocol requires that:
the order of the group G be divisible by $P_\pi$ and be coprime to $P_{\bar{\pi}}$; and
an order of x in the group G be divisible by $P_\pi$.

50. The method of claim 46 wherein in operation (2), the integer e is generated as a random number.

51. The method of claim 46 comprising the operation (5A) wherein the first proof data comprises an output of a cryptographic hash function on an input comprising the values a, b, and $\pi$.

52. The method of claim 46 comprising the operation (5B), wherein the second proof data comprises an output of a cryptographic hash function on an input comprising the values a, b, and $\pi$.

53. The method of claim 46 wherein in accordance with the authentication protocol, the predefined set PP of positive integers consists of ordered pairs of the positive integers, wherein each value $\pi\pi$ in the set $\Pi$ is associated with a unique bit-string $s_{\pi\pi}$ each bit of which corresponds to a single one of the ordered pairs and selects which of the two positive integers of the single one of the ordered pairs belongs to the subset $\theta$ associated with the value $\pi\pi$.

54. A method for operating a network, the method comprising carrying, by the network, a computer program operable to cause implementation of the method of claim 53 by the first computer system, wherein the computer program is provided to the network from a non-transitory computer-readable storage medium.

55. The method of claim 46 wherein the integers in the predefined set PP are pairwise coprime.

56. The method of claim 46 wherein according to the authentication protocol, the order of the group G is divisible by $P_\pi$ but is coprime to $P_{\bar{\pi}}$.

57. The method of claim 56 wherein according to the authentication protocol, $|G|/|\langle x \rangle|$ is coprime to the product P of all the integers in the set PP, where $|G|$ is the order of G, and where $|\langle x \rangle|$ is the order of the element x.

58. A non-transitory computer-readable storage medium comprising one or more computer instructions for a computer system to perform operations (1) through (5) of the first computer system of the method of claim 57.

59. The method of claim 46 wherein the authentication protocol requires the second computer system to determine the values a and b from y and z using Euler's totient function $\phi(N)$.

60. An apparatus comprising circuitry for performing the method of claim 46.

61. A computer-implemented cryptographic method establishing a secure communication between first and second computer systems based on a predefined security value $\pi$ in execution of a predefined authentication protocol, the value $\pi$ being one of a predefined set of values Π, the method comprising the second computer system performing the following operations in accordance with the authentication protocol:

(1) generating, from the value $\pi$, first data representing a description of a group G and of an element x whose order in the group G is greater than 1, wherein the orders of the group G and the element x have a predefined relationship to the value $\pi$;

wherein the authentication protocol requires each value in the set Π to be associated with a subset θ of a predefined set PP of positive integers, the subset θ consisting of one or more of the positive integers, different values in the set Π being associated with different subsets θ, wherein a product of all of the one or more integers in a subset θ associated with any one of the values in the set Π is different from a product of all of the one or more integers in a subset θ associated with any other one of the values in the set Π;

wherein the authentication protocol requires the first computer system to know at least one of (i) the subset θ associated with the value $\pi$, (ii) a product $P_\pi$ of all of the one or more integers in the subset θ associated with the value $\pi$, (iii) a product $P_{\bar{\pi}}$ of all of the one or more integers in the set PP but not in the subset θ associated with the value $\pi$;

(2) sending the first data to the first computer system and receiving in response data representing elements y and z of the group G, wherein the authentication protocol requires v to be equal to $x^e$ where e is an integer not provided to the second computer system;

(3) generating data representing a value a defined by a discrete logarithm of y' to base x', where y' and x' are elements of a proper subgroup of G, y' being a function of y;

wherein the authentication protocol requires the value a to be congruent to e mod $P_\pi$;

(4) generating data representing a value $b=z^{1/P_{\bar{p}}}$;

(5) using the values a and b for at least of one of the first and second computer systems to prove knowledge of the value $\pi$ to the other one of the first and second computer systems, and/or for generating a cryptographic key.

62. The method of claim 61 wherein:

$$y' = y^{|G|/P_p}$$

where $P_\pi$ is coprime to $P_{\bar{p}}$; and
said subgroup has order $P_\pi$.

63. The method of claim 61 wherein the order of G is coprime to $P_{\bar{p}}$ but is divisible by $P_\pi$, where $P_\pi$ is coprime to $P_{\bar{p}}$.

64. A method for operating a network, the method comprising carrying, by the network, a computer program operable to cause implementation of the method of claim 61 by the second computer system, wherein the computer program is provided to the network from a non-transitory computer-readable storage medium.

65. A non-transitory computer-readable storage medium comprising one or more computer instructions for a computer system to perform operations (1) through (5) of the second computer system of the method of claim 61.

66. The method of claim 61 wherein the order of the element x is divisible by $P_\pi$.

67. The method of claim 61 comprising the operation (5A), wherein the first proof data comprises an output of a cryptographic hash function on an input comprising the values a, b, and $\pi$.

68. The method of claim 61 comprising the operation (5B), wherein the second proof data comprises an output of a cryptographic hash function on an input comprising the values a, b, and $\pi$.

69. The method of claim 61 wherein in accordance with the authentication protocol, the predefined set PP of positive integers consists of ordered pairs of the positive integers, wherein each value $\pi\pi$ in the set Π is associated with a unique bit-string $s_{\pi\pi}$ each bit of which corresponds to a single one of the ordered pairs and selects which of the two positive integers of the single one of the ordered pairs belongs to the subset θ associated with the value $\pi\pi$.

70. A method for operating a network, the method comprising carrying, by the network, a computer program operable to cause implementation of the method of claim 69 by the first computer system, wherein the computer program is provided to the network from a non-transitory computer-readable storage medium.

71. The method of claim 61 wherein the integers in the predefined set PP are pairwise coprime.

72. The method of claim 71 wherein according to the authentication protocol, $|G|/|\langle x \rangle|$ is coprime to the product P of all the integers in the set PP, where $|G|$ is the order of G, and where $|\langle x \rangle|$ is the order of the element x.

73. A non-transitory computer-readable storage medium comprising one or more computer instructions for a computer system to perform operations (1) through (5) of the first computer system of the method of claim 72.

74. The method of claim 61 wherein each of the values a and b are determined by the second computer system using Euler's totient function $\phi(N)$.

75. An apparatus comprising circuitry for performing the method of claim 61.

* * * * *

UNITED STATES PATENT AND TRADEMARK OFFICE
CERTIFICATE OF CORRECTION

PATENT NO. : 8,132,006 B2
APPLICATION NO. : 11/415558
DATED : March 6, 2012
INVENTOR(S) : Amin Ramzan Zulfikar et al.

Page 1 of 1

It is certified that error appears in the above-identified patent and that said Letters Patent is hereby corrected as shown below:

In the Drawings

In Fig. 4, at step 460, in the superscript, replace "$p1\text{-}s_i$" by --$p_i,1\text{-}s_i$--

In the Specification

Column 7, line 11, replace "to the server" by --to the client--

Column 8, line 15, in the superscript, replace "-1/p" by --1/p--

Column 8, line 48, in the superscript, replace "$p1\text{-}s_i$" by --$p_i,1\text{-}s_i$--

Column 8, line 57, before "the same", insert:
--The client and the server then verify that their respective values $b_i$ and $a_i=e_i$ mod $p_i,s_i$ are--

Signed and Sealed this
Twenty-sixth Day of May, 2015

Michelle K. Lee
*Director of the United States Patent and Trademark Office*